United States Patent
Matsumoto et al.

(10) Patent No.: US 9,692,238 B2
(45) Date of Patent: Jun. 27, 2017

(54) WIRELESS POWER TRANSMISSION SYSTEM AND POWER TRANSMITTING DEVICE

(71) Applicant: Panasonic Corporation, Osaka (JP)

(72) Inventors: Hiromu Matsumoto, Osaka (JP); Hiroshi Kanno, Osaka (JP); Hiroshi Yamamoto, Osaka (JP); Tsutomu Sakata, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 350 days.

(21) Appl. No.: 14/609,530

(22) Filed: Jan. 30, 2015

(65) Prior Publication Data
US 2015/0236518 A1 Aug. 20, 2015

(30) Foreign Application Priority Data

Feb. 18, 2014 (JP) ................................ 2014-028577

(51) Int. Cl.
*H02J 5/00* (2016.01)
*H02J 17/00* (2006.01)

(52) U.S. Cl.
CPC .............. *H02J 5/005* (2013.01); *H02J 17/00* (2013.01)

(58) Field of Classification Search
CPC ...................................................... H02J 5/005
See application file for complete search history.

(56) References Cited

U.S. PATENT DOCUMENTS 9,006,935 B2 *  4/2015  Fukushima ............. H02J 5/005
                                                         307/104
9,030,052 B2 *  5/2015  Kim ..................... H04B 5/0031
                                                         307/104
9,565,794 B2 *  2/2017  Kanno ................... H01F 27/362
2012/0038218 A1   2/2012  Ichikawa
2014/0111022 A1   4/2014  Yamakawa

FOREIGN PATENT DOCUMENTS

| EP | 2 639 931 | 9/2013 |
| GB | 2 418 541 | 3/2006 |
| JP | 2010-166693 | 7/2010 |
| WO | 2013/002319 | 1/2013 |

OTHER PUBLICATIONS

Extended European Search Report issued Jul. 13, 2015 in European Application No. 151533557.2.

* cited by examiner

*Primary Examiner* — Hai L Nguyen
(74) *Attorney, Agent, or Firm* — Wenderoth, Lind & Ponack, L.L.P.

(57) ABSTRACT

A power transmitting device includes a power transmitting circuit that converts second DC power input from a DC power supply to AC power, a power transmitting antenna and a control circuit that receives a voltage value of the first DC power from the power receiving device. The control circuit changes a frequency of the AC power that is transmitted to the power receiving antenna, detects, from the received voltage values, a first frequency corresponding to a local minimum value of the voltage values and a second frequency corresponding to the voltage value that takes a local maximum value at a frequency higher than the first frequency, and sets the frequency of the AC power transmitted to the power receiving antenna to a frequency between the first frequency and the second frequency.

8 Claims, 19 Drawing Sheets

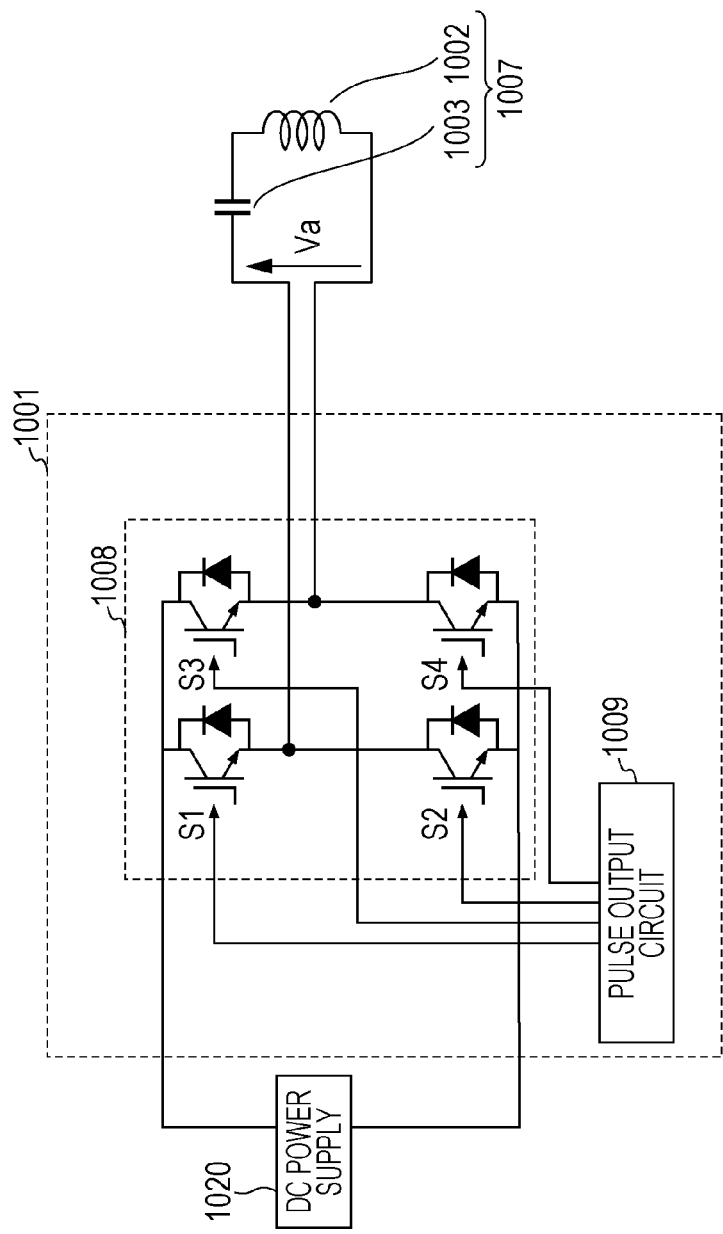

Duty 50%

Duty 25%

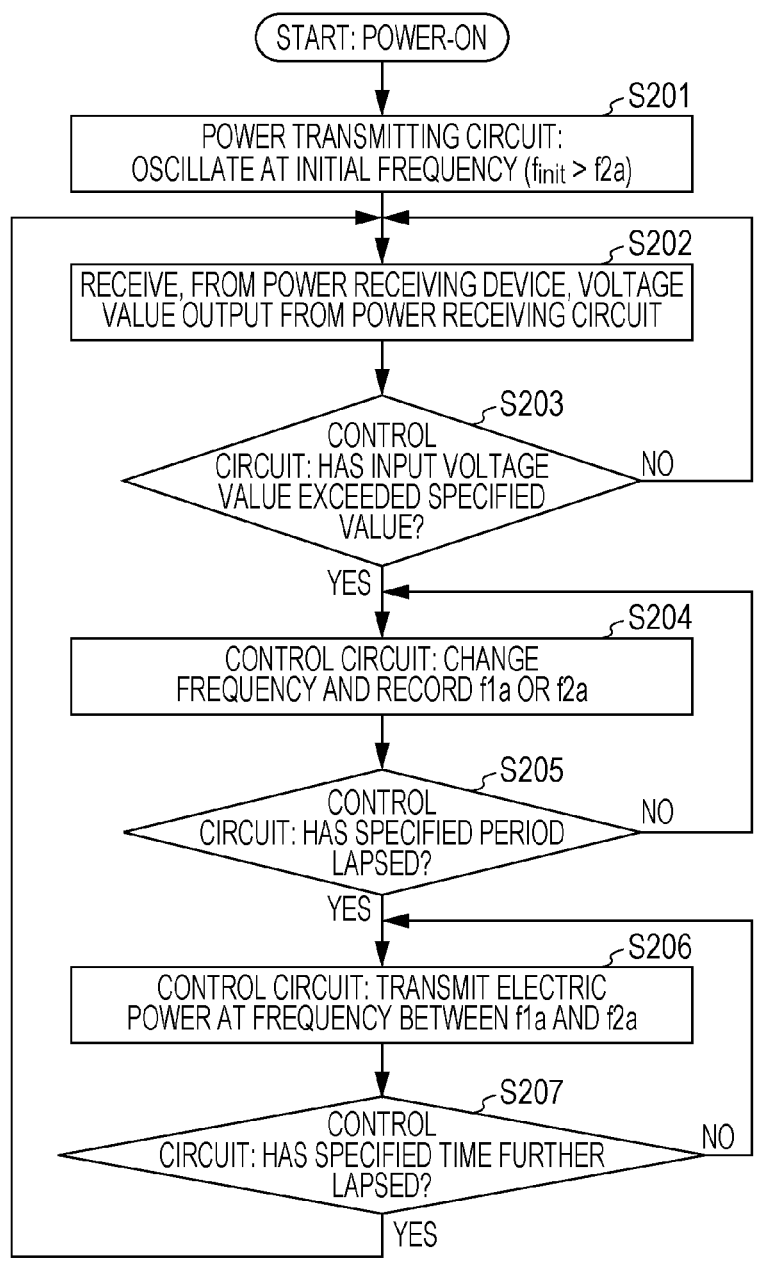

WIRELESS POWER TRANSMISSION SYSTEM AND POWER TRANSMITTING DEVICE

BACKGROUND

1. Technical Field

The present disclosure relates to a wireless power transmission system and a power transmitting device, which are used to transmit electric power between a power transmitting antenna and a power receiving antenna in a noncontact manner.

2. Description of the Related Art

Recently, a variety of mobile devices, such as a cellular phone, have become widespread, and power consumption of each mobile device has increased more and more with improvements of function and performance and diversification of contents. As the power consumption of the mobile device operated by a battery of a predetermined capacity increases, an operation lasting time of the mobile device shortens. A wireless power transmission system receives attention as a technique to compensate for a limitation of the battery capacity. The wireless power transmission system transmits electric power from a power transmitting device to a power receiving device in a noncontact manner through electromagnetic induction between a power transmitting antenna of the power transmitting device and a power receiving antenna of the power receiving device. In particular, a wireless power transmission system using the power transmitting antenna and the power receiving antenna of a resonance type is also called a resonant magnetic coupling system, and it can maintain high transmission efficiency even when positions of the power transmitting antenna and the power receiving antenna are deviated from each other. Therefore, the wireless power transmission system is expected to be applied to not only mobile devices, but also other various fields, such as electric cars.

SUMMARY

One non-limiting and exemplary embodiment provides a safe and highly-efficient power transmitting device in a wireless power transmission system, which is not yet obtained with the above-described related art and is still demanded in the art.

In one general aspect, the techniques disclosed here feature a power transmitting device, which transmits AC power in a noncontact manner to a power receiving device including a power receiving antenna, a power receiving circuit that converts the AC power received by the power receiving antenna to first DC power, and a load to which the first DC power is output from the power receiving circuit, the power transmitting device including a power transmitting circuit that converts second DC power input from a DC power supply to AC power, a power transmitting antenna that transmits the AC power output from the power transmitting circuit to the power receiving antenna, and a control circuit that receives, from the power receiving device, a voltage value of the first DC power output from the power receiving circuit to the load in the power receiving device, wherein the control circuit controls the power transmitting circuit to change a frequency of the AC power that is transmitted to the power receiving antenna, detects, from the received voltage values, a first frequency corresponding to a local minimum value of the voltage values and a second frequency corresponding to the voltage value that takes a local maximum value at a frequency higher than the first frequency, and sets the frequency of the AC power transmitted to the power receiving antenna to a frequency between the first frequency and the second frequency.

With one aspect of the present disclosure, the safe and highly-efficient power transmitting device can be obtained.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10A illustrates an example of configuration of a power transmitting circuit;

FIG. 18 is a flowchart illustrating the processing in accordance with the control method in the first embodiment.

DETAILED DESCRIPTION

Underlying Knowledge Forming Basis of the Present Disclosure

The inventors have found that the wireless power transmission system described in "BACKGROUND" accompanies with the following problem.

To maintain high transmission efficiency in the wireless power transmission system of resonance type described in "BACKGROUND", it is practiced to make matching between input and output impedances of each circuit block on a transmission path. Therefore, respective circuit constants (inductance and capacitance) of a transmitting-side circuit block and a receiving-side circuit block are decided in a stage of system design to be matched with preset input and output impedances of two resonators.

In the above-mentioned system in which the circuit constants are preset, however, a frequency providing optimum transmission efficiency varies when impedances of a power transmitting antenna and a power receiving antenna are changed with change of environments around the antennas, for example, when the positional relation between those two antennas is changed. The frequency providing optimum transmission efficiency varies as well when a load impedance is changed.

To cope with the above-described problem, Japanese Unexamined Patent Application Publication No. 2010-166693, for example, discloses a wireless power transmission system in which a frequency providing maximum transmission efficiency is decided through an operation of sweeping frequency at the start of power transmission.

As a result of actually measuring magnetic field intensity at the frequency providing maximum transmission efficiency, however, the inventors have newly found that, in some cases, the frequency providing maximum transmission efficiency is not a frequency at which power transmission can be performed safely.

With the analysis carried out by the inventors, the cause is as follows.

Figure 1:
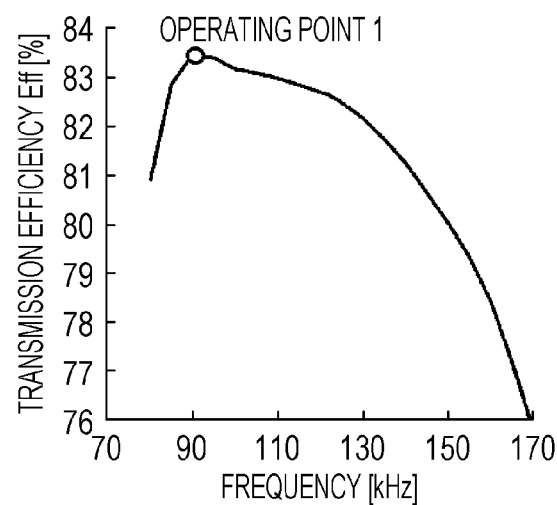
FIG. 1 is a graph depicting an example of relation between transmission efficiency and transmission frequency in a wireless power transmission system according to one aspect of the present disclosure.
Figure 4:
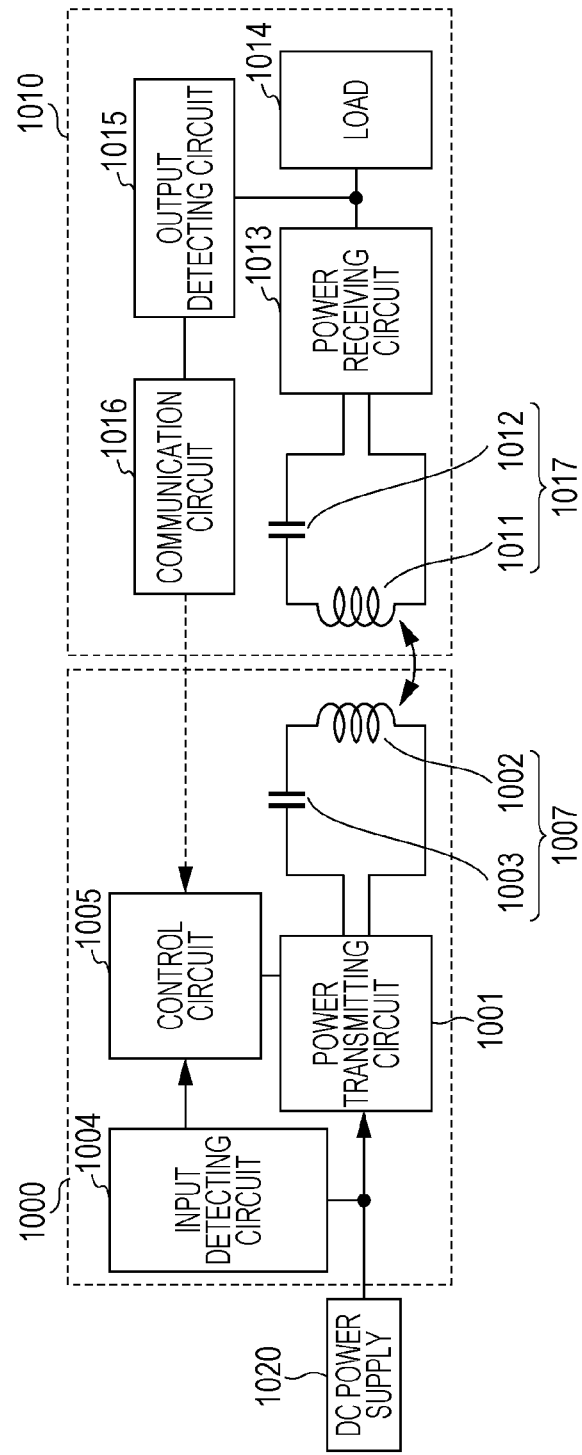
FIG. 4 is a block diagram illustrating configuration of a wireless power transmission system according to a first embodiment.

FIG. 1 is a graph depicting an example of relation between transmission efficiency and transmission frequency in a wireless power transmission system according to one aspect of the present disclosure. The horizontal axis represents the transmission frequency, and the vertical axis represents the transmission efficiency Eff. In this example, the analysis is performed using a circuit simulator, and the wireless power transmission system employs a similar configuration to that in a later-described first embodiment (FIG. 4). Specifications of the power transmitting antenna are set to an inductance value of 7.19 (uH), a resistance value of 0.56f0 (mΩ) at a frequency f0, and a resonant capacitor capacitance of 400 (nF). Specifications of the power receiving antenna are set to an inductance value of 16.7 (uH), a resistance value of 1.31f0 (mΩ) at the frequency f0, a resonant capacitor capacitance of 137 (nF), and a coupling coefficient of 0.57. Furthermore, a DC voltage Vdc of a DC power supply 1020 is set to 5 V, a frequency sweep range is set to 80 kHz to 170 kHz, and a load impedance RL is set to 5Ω. As seen from the graph, the transmission efficiency Eff is maximized at an operating point 1 of about 90 kHz. Accordingly, when electric power is transmitted by employing the wireless power transmission system under the above-described condition, highly-efficient power transmission can be realized by sweeping the frequency to search for the operating point 1, and by operating the system at a frequency as close as to the operating point 1. The wireless power transmission system disclosed in Japanese Unexamined Patent Application Publication No. 2010-166693 also performs the power transmission at the frequency at which the transmission efficiency is maximized.

Figure 2:
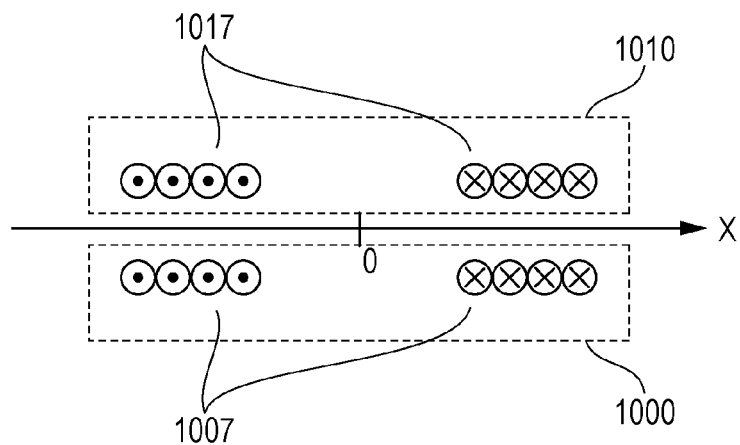
FIG. 2 is a sectional view illustrating an example of configuration of the wireless power transmission system.

FIG. 2 is a schematic sectional view illustrating a basic configuration of the wireless power transmission system. The wireless power transmission system includes a power transmitting device 1000 and a power receiving device 1010. The power transmitting device 1000 includes a power transmitting antenna 1007, and the power receiving device 1010 includes a power receiving antenna 1017. Electric power is transmitted from the power transmitting device 1000 to the power receiving device 1010 through both the antennas in a noncontact manner. FIG. 2 illustrates an example in which a spiral coil wound in the planar form is used as each of the power transmitting antenna 1007 and the power receiving antenna 1017.

Figure 3:
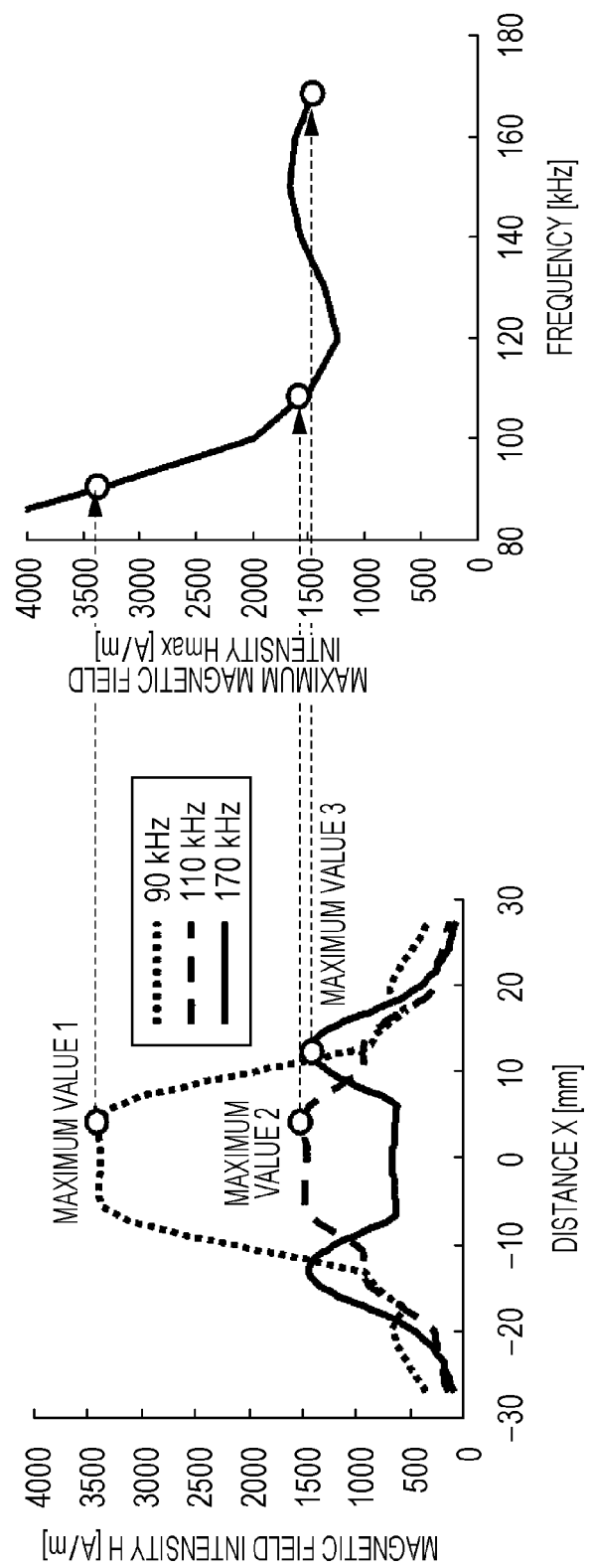
FIG. 3 is a graph depicting an example of relation between transmission frequency and distribution of a magnetic field between the power transmitting and receiving antennas illustrated in FIG. 2.

A graph on the left side of FIG. 3 depicts distribution of a magnetic field along a centerline X between the power transmitting antenna 1007 and the power receiving antennas 1017 illustrated in FIG. 2. The horizontal axis represents a distance X from a center axis of each antenna, and the vertical axis represents magnetic field intensity H. The depicted distribution of the magnetic field is obtained through analysis using an electromagnetic field simulator. A spiral coil having an outer diameter of 43 (mm), an inner diameter of 20.5 (mm), the number of turns of 10, and a thickness of 1 (mm) is used as the coil of the power transmitting antenna 1007. A rectangular spiral coil having an outer dimension of 44.5 (mm)×30.5 (mm), an inner dimension of 28.8 (mm)×14.8 (mm), the number of turns of 14, and a thickness of 0.5 (mm) is used as the coil of the power receiving antenna 1017. The centerline X is defined as a line (see an X-axis in FIG. 2), which passes a midpoint of a segment interconnecting centers of both the antennas, and which is parallel to a minor axis of the power receiving antenna. A distance between the power transmitting and receiving antennas is set to 6 (mm). Analysis conditions are the same as those in the circuit simulator used in the analysis for the graph of FIG. 1.

The magnetic field intensity H in the graph on the left side of FIG. 3 is obtained by plotting a peak value of the magnetic field intensity in all phases within one period at individual points on the centerline X when the frequency is 90 (kHz), 110 (kHz), and 170 (kHz), for example. The distribution of the magnetic field at the frequency of 90 (kHz), depicted in the graph on the left side of FIG. 3, corresponds to the operating point 1 in FIG. 1. As seen from the graph on the left side of FIG. 3, the distribution of the magnetic field is quite different depending on frequency.

A graph on the right side of FIG. 3 plots a maximum value Hmax of the magnetic field intensity on the centerline X for each frequency within the sweep range of the simulation in relation to the graph on the left side of FIG. 3.

As described above, highly-efficient power transmission can be realized by operating the wireless power transmission system at the frequency at which maximum transmission efficiency is obtained, as illustrated in FIG. 1. However, it has been found from the graph on the right side of FIG. 3 that the magnetic field intensity is much higher at 90 (kHz), at which the maximum transmission efficiency is obtained in the graph of FIG. 1, than that generated at other frequencies above 90 (kHz). It has also been found that as a frequency increases from 90 (kHz) at which the maximum transmission efficiency is obtained, the magnetic field intensity reduces and becomes substantially constant beyond a certain frequency. From those findings, it can be understood that the power transmission is not performed safely at the frequency providing the maximum transmission efficiency. Namely, when a metallic foreign matter enters between the power transmitting antenna and the power receiving antenna, or when a metallic part is arranged around the power transmitting antenna or the power receiving antenna, the metallic foreign matter or the metallic part produces heat due to the magnetic fields generated from both the antennas.

Thus, Japanese Unexamined Patent Application Publication No. 2010-166693 discloses the idea of performing the power transmission at the frequency at which the transmission efficiency is maximized. However, Japanese Unexamined Patent Application Publication No. 2010-166693 does not take into consideration the influences of the magnetic fields generated by the power transmitting antenna and the power receiving antenna.

Accordingly, Japanese Unexamined Patent Application Publication No. 2010-166693 accompanies with the problem that the power transmission is not performed safely.

Through the review discussed above, the inventors have found the above-described new problem and have conceived the following aspects of the present disclosure. More specifically, regarding the transmission frequency at which the power transmission is performed, an operation frequency range where the power transmitting device is operated is decided on the basis of a new index, i.e., the magnetic field intensity, which has not been used so far. As a result, the magnetic field intensity is reduced, and the power transmission can be performed in a safe and highly-efficient manner.

In one general aspect, the techniques disclosed here feature a power transmitting device, which transmits AC power in a noncontact manner to a power receiving device including a power receiving antenna, a power receiving circuit that converts the AC power received by the power receiving antenna to first DC power, and a load to which the first DC power is output from the power receiving circuit, the power transmitting device including a power transmitting circuit that converts second DC power input from a DC power supply to AC power, a power transmitting antenna that transmits the AC power output from the power transmitting circuit to the power receiving antenna, and a control circuit that receives, from the power receiving device, a voltage value of the first DC power output from the power receiving circuit to the load in the power receiving device, wherein the control circuit controls the power transmitting circuit to change a frequency of the AC power that is transmitted to the power receiving antenna, detects, from the received voltage values, a first frequency corresponding to a local minimum value of the voltage values and a second frequency corresponding to the voltage value that takes a local maximum value at a frequency higher than the first frequency, and sets the frequency of the AC power transmitted to the power receiving antenna to a frequency between the first frequency and the second frequency.

The inventors have found that as a frequency increases from the frequency at which the transmission efficiency is maximized, the magnetic field intensity reduces. On the other hand, it has been confirmed that the magnetic field intensity becomes substantially constant in a low state, although the transmission efficiency is not maximum, by employing a frequency higher than the first frequency corresponding to the local minimum value of the voltage value of the first DC power that is input from the power receiving device. Furthermore, the inventors have found that, when a frequency range higher than the first frequency is used, there is a frequency at which the transmission efficiency is not so reduced though not being a maximum. Such a frequency is present between the first frequency and the second frequency corresponding to the voltage value that takes a local maximum value at a frequency higher than the first frequency. Thus, it has been confirmed that an operation frequency range of the power transmitting device where the magnetic field intensity is low and the transmission efficiency is high is given as a range between the first frequency and the second frequency.

According to the above-described aspect, from the received voltage values, the first frequency corresponding to the local minimum value of the voltage value and the second frequency corresponding to the voltage value, which takes the local maximum value at the frequency higher than the first frequency, are detected. Then, the frequency of the AC power transmitted to the power receiving antenna is set to the frequency between the first frequency and the second frequency. As a result, the magnetic field intensity can be reduced, and the power transmission can be performed in a safe and highly-efficient manner. In other words, even when a metallic foreign matter enters between the power transmitting antenna and the power receiving antenna, or even when a metallic part is arranged around the power transmitting antenna or the power receiving antenna, it is possible to suppress heat generation from the metallic foreign matter or the metallic part caused by the magnetic fields generated from both the antennas, and to realize safe power transmission while the transmission efficiency is maintained at a certain or higher level.

Specific embodiments of the present disclosure will be described below with reference to the accompanying drawings. In the following description, the same or corresponding elements are denoted by the same reference symbols.

First Embodiment

FIG. 4 is a block diagram illustrating configuration of a wireless power transmission system according to a first embodiment of the present disclosure. The wireless power transmission system includes a power transmitting device 1000 and a power receiving device 1010. In this system, electric power is transmitted from the power transmitting device 1000 to the power receiving device 1010 in a noncontact manner. The power transmitting device 1000 includes a power transmitting circuit 1001 that converts direct current (DC) power input from a DC power supply 1020 to AC power and that outputs the converted AC power, and a power transmitting antenna 1007 that transmits the AC power output from the power transmitting circuit 1001 in a noncontact manner. The power transmitting antenna 1007 includes a power transmitting coil 1002 and a resonance capacitor 1003 that is connected between the power transmitting circuit 1001 and the power transmitting coil 1002.

The power receiving device 1010 includes a power receiving antenna 1017 that is arranged to face the power transmitting antenna 1007 and that receives at least part of the AC power transmitted from the power transmitting antenna 1007, a power receiving circuit 1013 that rectifies and smoothens the AC power output from the power receiving antenna 1017, and a load 1014 that receives DC power output from the power receiving circuit 1013. The power receiving antenna 1017 includes a power receiving coil 1011 and a resonance capacitor 1012 that is connected between the power receiving circuit 1013 and the power receiving coil 1011.

The power receiving device 1010 may be, e.g., an electronic unit such as a smartphone, a tablet terminal, or a portable terminal, or a motor-driven machine such as an electric car. The power transmitting device 1000 may be an electric charger that supplies electric power to the power receiving device 1010 in a noncontact manner. The load 1014 is, e.g., a secondary battery that may be charged with the DC power output from the power receiving circuit 1013.

The power receiving device 1010 further includes an output detecting circuit 1015 that detects a DC voltage and a DC current output from the power receiving circuit 1013, and a communication circuit 1016 that communicates the result detected by the output detecting circuit 1015 to the power transmitting device 1000. The output detecting circuit 1015 detects the voltage and the current, which are output from the power receiving circuit 1013, at specified time intervals during the transmission operation, and the communication circuit 1016 successively communicates the detection result to the power transmitting device 1000.

The power transmitting device 1000 further includes an input detecting circuit 1004 that detect a DC voltage and a DC current input from the DC power supply 1020, and a control circuit 1005 that control a frequency of the AC power output from the power transmitting circuit 1001. When starting the transmission operation, the control circuit 1005 first sweeps the frequency of the AC power output from the power transmitting circuit 1001 and sets the operation frequency range of the power transmitting circuit 1001 in accordance with the result detected by the output detecting circuit 1015 and communicated from the communication circuit 1016. Then, the control circuit 1005 controls the power transmitting circuit 1001 such that the frequency of the AC power output from the power transmitting circuit 1001 is given as a proper frequency within the set operation frequency range, which is decided in accordance with the respective results detected by the output detecting circuit 1015 and the input detecting circuit 1004. Here, the term "operation frequency range" implies a frequency range that may be set when the power transmitting circuit 1001 executes the operation for the power transmission.

With the configuration described above, the wireless power transmission system of this embodiment can set, in accordance with the result detected by the output detecting circuit 1015, the operation frequency range of the power transmitting circuit 1001 to a frequency range where the magnetic field intensity is comparatively low. Thus, the electric power can be transmitted safely in a noncontact manner by transmitting the electric power just in the range where the magnetic field intensity is comparatively low.

Individual components will be described in detail below.

Figure 5:
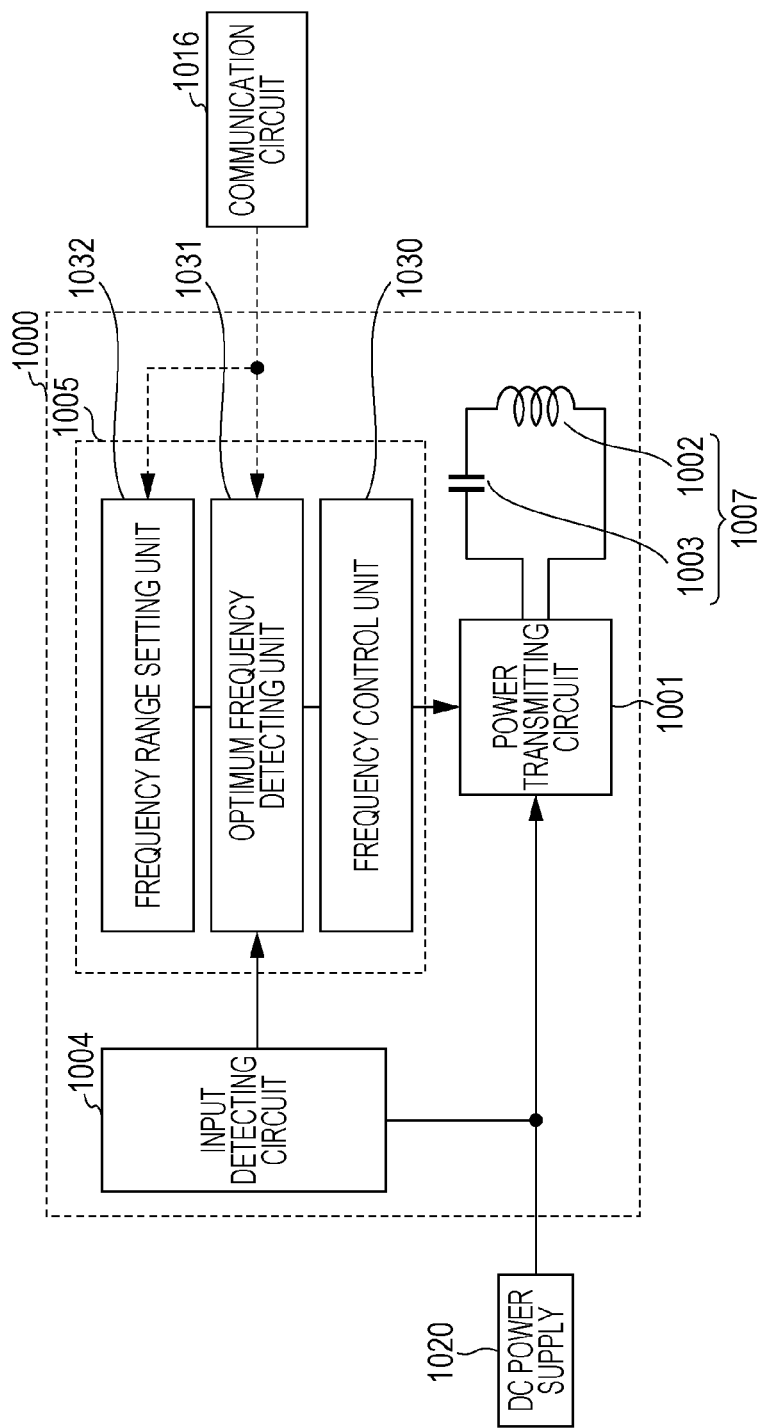
FIG. 5 is a block diagram illustrating detailed configuration of a power transmitting device according to the first embodiment.

FIG. 5 is a block diagram illustrating detailed configuration of the power transmitting device 1000 according to the first embodiment. In FIG. 5, components in common to those in FIG. 4 are denoted by the same reference numerals. FIG. 5 illustrates three functional blocks implemented by the control circuit 1005. More specifically, the three functional blocks are a frequency control unit 1030, an optimum frequency detecting unit 1031, and a frequency range setting unit 1032. The control circuit 1005 may be implemented, for example, as a combination of a CPU (Central Processing Unit) and a computer program stored in a memory. Respective functions of the functional blocks illustrated in FIG. 5 are realized with the CPU executing a group of commands described in the computer program. Alternatively, similar functions may be realized with hardware, such as a DSP (Digital Signal Processor) that a computer program is incorporated in one semiconductor circuit.

In accordance with the result detected by the output detecting circuit 1015 and communicated from the communication circuit 1016, the frequency range setting unit 1032 sets the frequency range where the magnetic field intensity is low and safety is ensured. More specifically, the frequency range setting unit 1032 first successively acquires the result detected by the output detecting circuit 1015 during a period in which the frequency control unit 1030 is sweeping the frequency of the AC voltage output from the power transmitting circuit 1001, and obtains frequency characteristics of the output voltage of the power receiving circuit 1013 from the acquired information.

Figure 6A:
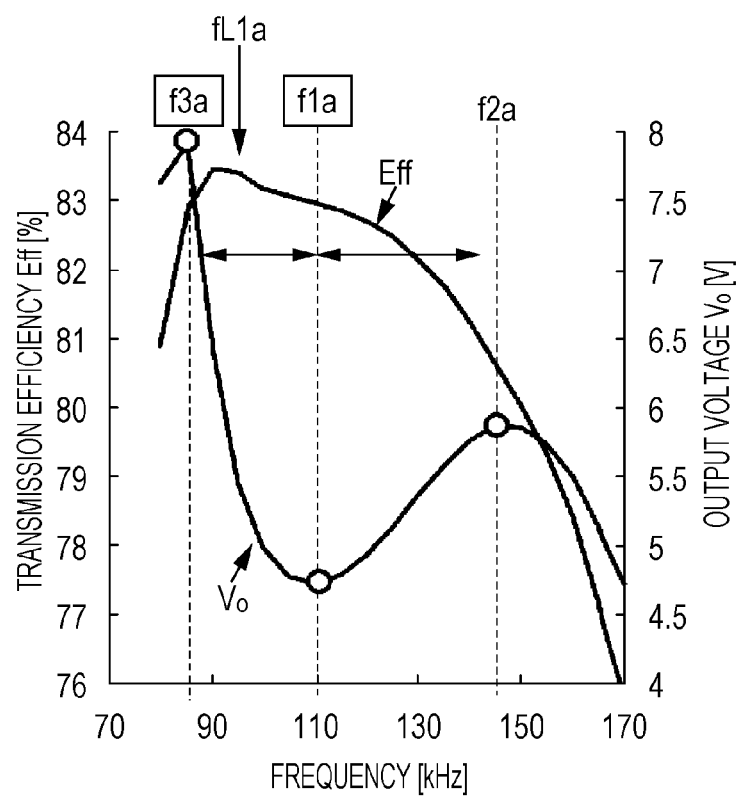
FIG. 6A is a graph depicting relation between transmission frequency and each of transmission efficiency and voltage (output voltage) applied to a load in the first embodiment.
Figure 6B:
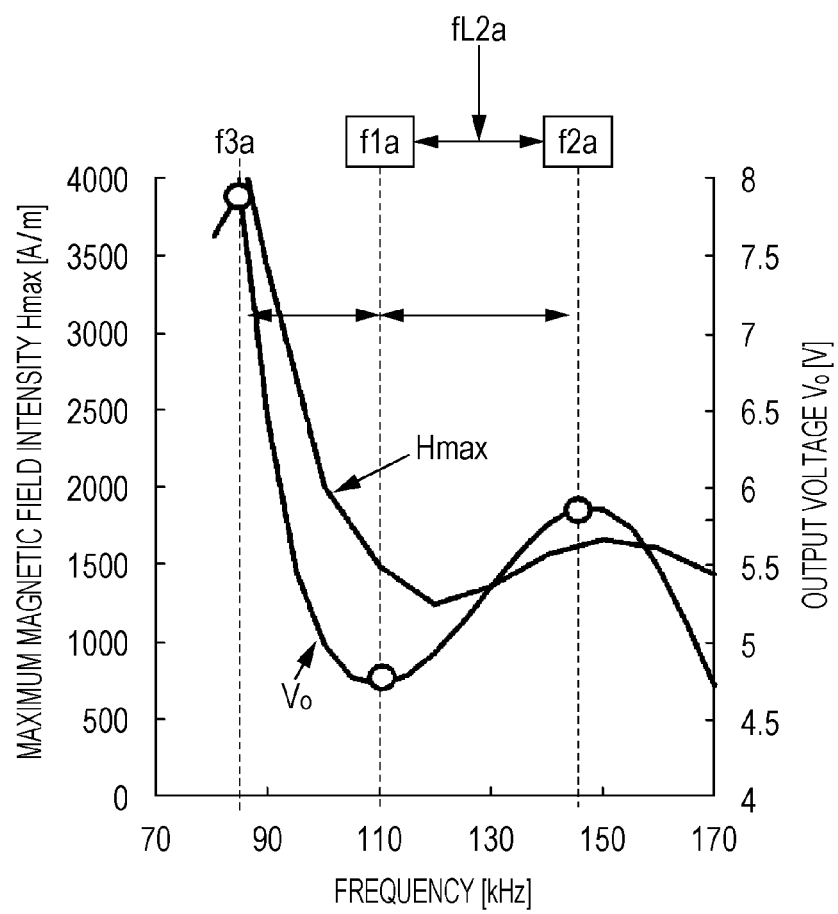
FIG. 6B is a graph depicting relation between transmission frequency and each of the distribution of the magnetic field and the output voltage in the first embodiment.

FIGS. 6A and 6B depict examples of frequency characteristics of an output voltage Vo. Operating conditions are the same as those used in the simulation for the graph of FIG. 1. FIG. 6A depicts the transmission efficiency Eff, depicted in FIG. 1, along with the output voltage Vo. FIG. 6B depicts the maximum magnetic field intensity Hmax, depicted in the graph on the right side of FIG. 3, along with the output voltage Vo. As seen from FIGS. 6A and 6B, the output voltage Vo takes a local minimum value at a frequency f1$a$, takes a first local maximum value at a frequency f2$a$ higher than the frequency f1$a$, and takes a second local maximum value at a frequency f3$a$ lower than the frequency f1$a$. The transmission efficiency Eff is maximized at a frequency within the range from the frequency f3$a$ to f1$a$. On the other hand, as seen from FIG. 6B, the maximum magnetic field intensity Hmax increases in a frequency range lower than the frequency f1$a$ at which the output voltage Vo takes the local minimum value. Accordingly, when the power transmission is performed at the frequency at which the transmission efficiency Eff is maximized, a risk of unwanted heat generation is increased. In view of the above point, the frequency range setting unit 1032 sets, as the operation frequency range of the power transmitting circuit 1001, a frequency lower limit fL1$a$ between the frequency f3$a$ and the frequency f1$a$, as illustrated in FIG. 6A, after experimentally confirming the frequency at which there is in fact a risk of heat generation. In other words, the frequency fL1$a$ satisfying f3$a$<fL1$a$≤f1$a$ is set as a lower limit of the operation frequency range of the power transmitting circuit 1001. An upper limit of the operation frequency range is set to, e.g., the frequency f2$a$ at which the transmission efficiency is comparatively high. By setting the operation frequency range to span from fL1$a$ to $f$2$a$, highly-efficient power transmission can be realized while safety is ensured. The frequency lower limit fL1$a$ is not to be set as a fixed frequency value in some cases. For example, a frequency at which the output voltage Vo has increased by 10% from the local minimum value of the output voltage Vo at the frequency f1$a$ may be set as fL1$a$. This enables the frequency lower limit fL1$a$ to be properly decided depending on variation of the output voltage Vo.

The simulation results depicted in FIGS. 6A and 6B are results obtained on condition of the load RL=5Ω and the coupling coefficient of 0.57 as described above. When the load and the coupling coefficient vary, the frequency characteristics of the magnetic field intensity Hmax and the output voltage Vo are changed and the safe frequency range is also changed. Therefore, the frequency range setting unit 1032 may be configured to calculate a load in accordance with the result detected by the output detecting circuit 1015, and to newly set the operation frequency range again when the load has varied. On that occasion, the frequency is desirably swept starting from a higher frequency than the frequency at which the electric power is actually transmitted, toward a lower frequency. The reason is in that, as seen from FIG. 6B, an optimum frequency can be searched for in a safer manner by starting the sweep from a higher frequency region where the output voltage Vo and the magnetic field intensity Hmax are relatively low.

The lower limit of the operation frequency range may be set to a frequency between the frequency f1a and the frequency f2a as illustrated in FIG. 6B. In other words, a frequency fL2a satisfying f1a<fL2a<f2a may be set as the lower limit of the operation frequency range. By setting fL2a as the lower limit of the operation frequency range, the electric power can be transmitted more safely in the frequency region in which fluctuations of the magnetic field intensity Hmax are less, even when the load and the coupling coefficient between the antennas vary.

Whether the lower limit of the operation frequency range is set to fL1a or fL2a may be previously selected in consideration of characteristics of the load. When the frequency fL1a is set as the lower limit, the power transmission can be performed with higher efficiency. On the other hand, when the frequency fL2a is set as the lower limit, the power transmission can be performed with higher safety. As an alternative, a frequency different from those set in the above-mentioned examples may be set as the lower limit of the operation frequency range.

After the frequency range setting unit 1032 has set the operation frequency range, the optimum frequency detecting unit 1031 decides, within the set operation frequency range, a frequency at which the transmission efficiency is maximized, in accordance with both the result detected by the output detecting circuit 1015 and communicated from the communication circuit 1016 and the result detected by the input detecting circuit 1004. The frequency control unit 1030 controls the power transmitting circuit 1001 such that the transmission frequency is held at the frequency decided by the optimum frequency detecting unit 1031.

The optimum frequency detecting unit 1031 may start the sweep from a frequency higher than the frequency f2a, for example, and may stop the frequency sweep when the transmission efficiency reaches a maximum value before the sweep reaches the frequency fL1a or fL2a. Then, the power transmission may be continued at the frequency at which the maximum efficiency is obtained.

The power transmitting circuit 1001 in this embodiment may be constituted, for example, as a combination of a gate driver and a D-class full-bridge inverter, which are known in the art. The power transmitting circuit 1001 executes switching operation in accordance with an instruction from the frequency control unit 1030, thereby converting the input DC voltage to the AC voltage. It is to be noted that the configuration of the power transmitting circuit 1001 is not limited to the above combination, and various oscillation circuits may be optionally used to implement the power transmitting circuit 1001.

Examples of configurations of the power transmitting antenna 1007 and the power receiving antenna 1017 will be described below.

The power transmitting antenna 1007 and the power receiving antenna 1017 can transmit AC power in a non-contact manner through electromagnetic induction (including resonant magnetic coupling). The power receiving coil 1011 is not in contact with the power transmitting coil 1002 and is spaced from the power transmitting coil 1002 by a distance of several millimeters to several tens centimeters, for example. The frequency of transmitted high-frequency electric power (i.e., the transmission frequency) may be set to the range of 50 Hz to 300 GHz, for example. The transmission frequency may be set to the range of 20 kHz to 10 GHz, or to the range of 20 kHz to 20 MHz, or to the range of 20 kHz to 1 MHz. The sizes of the power transmitting coil 1002 and the power receiving coil 1011 are not to be the same in some cases. The power transmitting coil 1002 may be smaller than the power receiving coil 1011. Conversely, the former may be larger than the latter. Each of the power transmitting antenna and the power receiving antenna may include a plurality of coils.

In general, it is known that, when two resonators having specific resonance frequencies are electrically coupled to each other, the resonance frequencies are changed. Even if the resonance frequencies of the two resonators are the same, the resonance frequency of the resonator pair is separated into two frequencies through the coupling. Of the two resonance frequencies provided by the coupled resonator pair, higher one is called an even-mode resonance frequency (fH), and lower one is called an odd-mode resonance frequency (fL). In that case, a coupling coefficient k between the resonators is expressed by the following formula (1).

$$k=(fH-fL) \div (fH+fL) \qquad (1)$$

The stronger the coupling, the larger is a value of k and the larger is a separation between the two resonance frequencies. In this embodiment, the value of k may be set to a comparatively low value, e.g., the range of 0.1<k<0.6, specifically the range of 0.2<k<0.4 in one example. The value of k may exceed 0.6. However, the influences of an increase of the distance between the transmitting and receiving antennas, asymmetry in sizes between the transmitting and receiving antennas, etc. can be made less by setting the value of k to be smaller than 0.6.

A Q value of the resonator constituting each antenna may be set to, e.g., several tens to 100, specifically a value larger than 100 in one example, though depending on the efficiency of the power transmission between the antennas, which is demanded by the system, and the value of the coupling coefficient k.

In the example illustrated in FIG. 4, the power transmitting antenna 1007 is constituted as a series resonance circuit in which the power transmitting coil 1002 and the resonance capacitor 1003 are connected in series. The power receiving antenna 1017 is also constituted as a series resonance circuit in which the power receiving coil 1011 and the resonance capacitor 1012 are connected in series. However, the configuration of each antenna is not limited to the above-described example. One or both of the power transmitting antenna 1007 and the power receiving antenna 1017 may be parallel resonance circuits.

Figure 7:
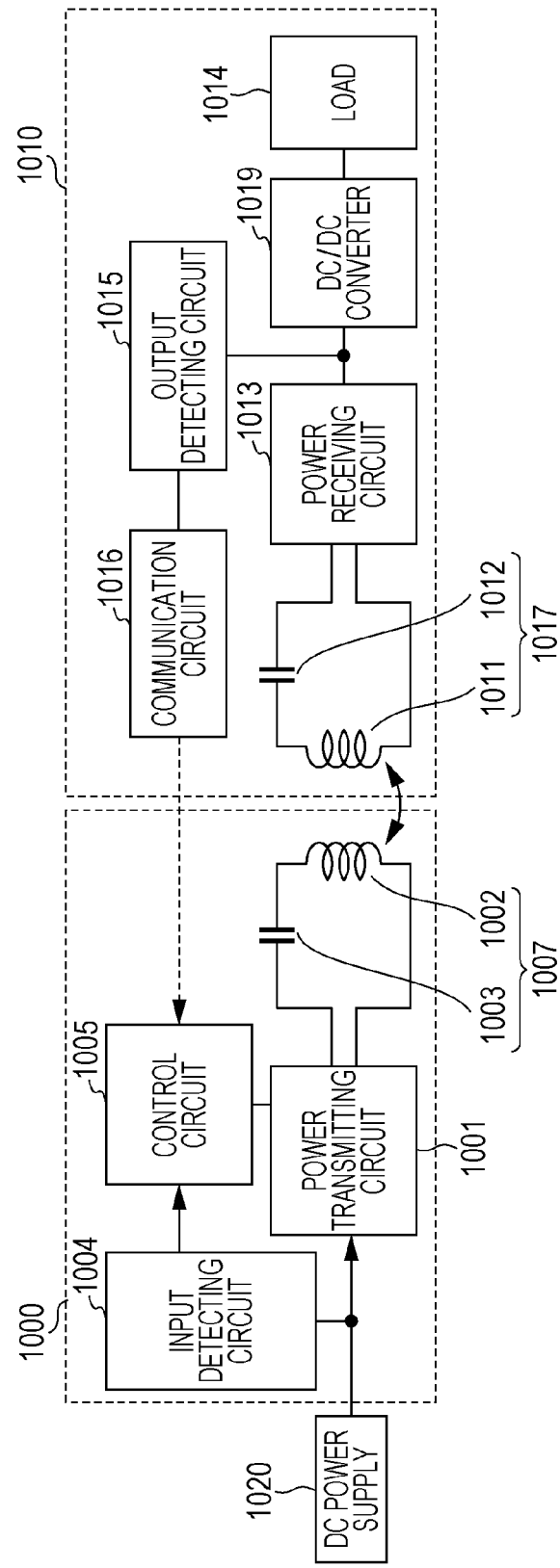
FIG. 7 is a block diagram illustrating a modification of the first embodiment.

Many electronic units, which may be each used as the power receiving device 1010, operate at constant voltages. In that case, as illustrated in FIG. 7, a DC/DC converter 1019 may be inserted between the power receiving circuit 1013 and the load 1014. With the insertion of the DC/DC converter 1019, the DC voltage supplied to the load 1014 can be maintained at a specified value.

One example of a communication method executed by the communication circuit 1016 is practiced by disposing a switch that changes a load impedance at an output terminal of the power receiving circuit 1013, and by turning on/off the switch at a frequency that is sufficiently different from the transmission frequency of the power transmitting circuit 1001. Stated in another way, a resistance and a capacitor are added in parallel to the load, and the load impedance is changed by switching over conduction of a line connecting the resistance and the capacitor. Because an input/output of the power transmitting circuit 1001 is also varied with change of the load impedance, the result detected by the output detecting circuit 1015 can be frequency-modulated by turning on/off the switch and can be communicated as information to the power transmitting device 1000. The power transmitting device 1000 can read the communicated information by detecting variation of the voltage across the power transmitting antenna 1007 or change of a current amount generated at an input terminal of the power transmitting circuit 1001 attributable to on/off of the switch, and by demodulating the detected result. The method for communicating the information is not limited to the above-described one, and the information may be transmitted by a quite different communication method, e.g., NFC (Near Field Communication) or Wireless LAN.

A control method executed by the control circuit 1005 in this embodiment will be described below. The following description is made on an assumption of the case where the lower limit of the operation frequency range is set to fL1a as illustrated in FIG. 6A.

Figure 8:
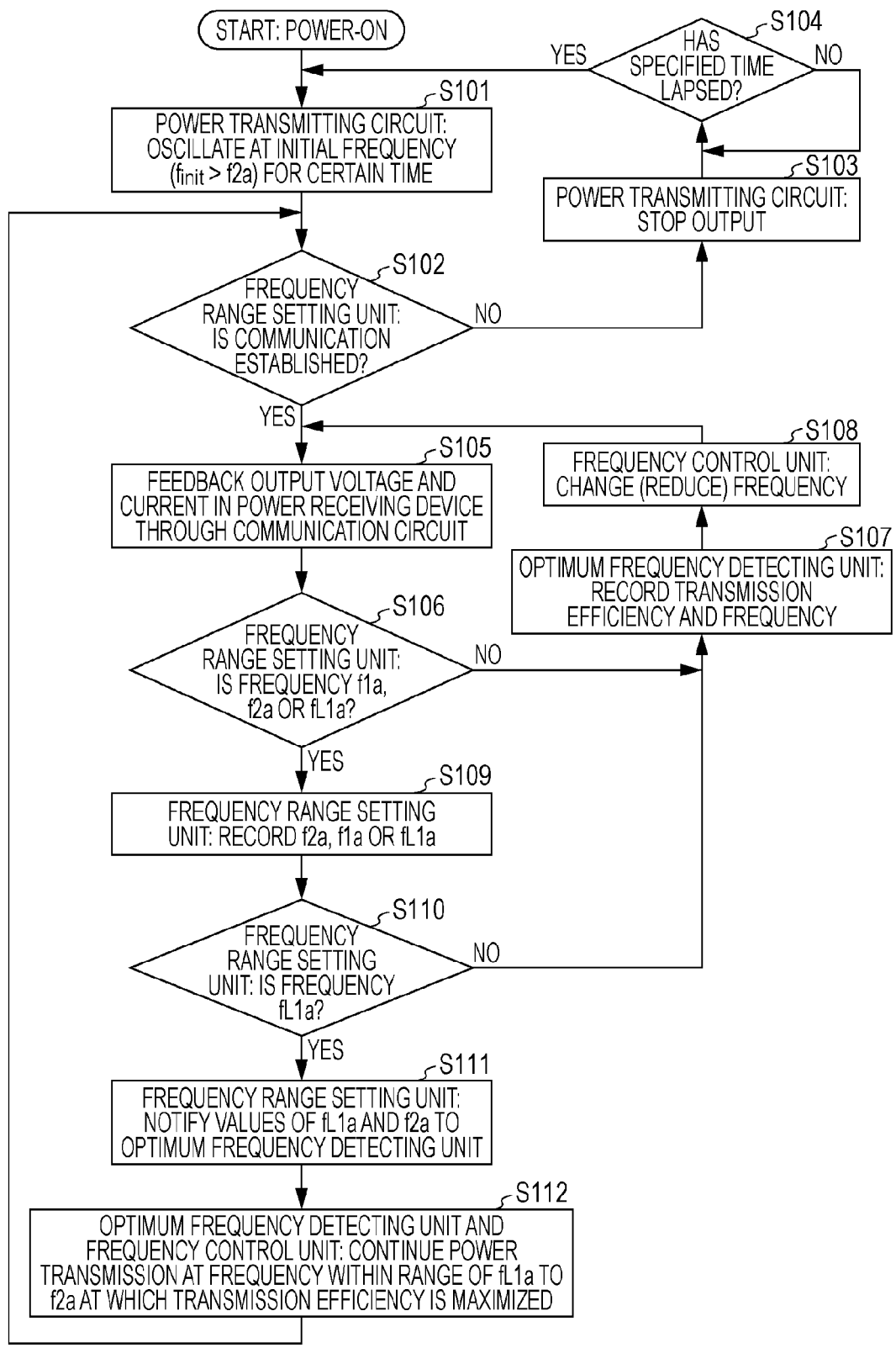
FIG. 8 is a flowchart illustrating processing in accordance with a control method in the first embodiment.

FIG. 8 is a flowchart illustrating processing in accordance with the control method. Upon receiving DC power from the DC power supply 1020, the input detecting circuit 1004 in the power transmitting device 1000 detects a voltage and a current input from the DC power supply 1020, and outputs the detected result to the frequency range setting unit 1032 and the optimum frequency detecting unit 1031. The frequency control unit 1030 outputs, to the power transmitting circuit 1001, information representing a predetermined initial frequency ($f_{init}$). In accordance with that information, the power transmitting circuit 1001 converts the DC power, supplied from the DC power supply 1020, to AC power, and sends the AC power to the power receiving device 1010 through the power transmitting antenna 1007 and the power receiving antenna 1017 (step S101). Here, the initial frequency is set to a value sufficiently higher than, e.g., the frequency f2a denoted in FIG. 6A.

Then, the frequency range setting unit 1032 determines whether communication is established between the power transmitting device 1000 and the power receiving device 1010 (step S102). The establishment of the communication can be determined depending on whether the result detected by the output detecting circuit 1015 has been communicated from the communication circuit 1016 on the receiving side. When the information from the receiving side has been successfully demodulated, the frequency range setting unit 1032 determines that the communication is established. On the other hand, when the information from the receiving side has not been successfully demodulated, the frequency range setting unit 1032 determines that the communication is not established. If the communication is not established, the frequency control unit 1030 stops the output of the power transmitting circuit 1001 (step S103). Thereafter, the control circuit 1005 waits until a specified time lapses (step S104), and returns to step S101 again after the lapse of the specified time.

If it is determined in step S102 that the communication is established, the frequency range setting unit 1032 and the optimum frequency detecting unit 1031 receive, via the communication circuit 1016, feedback of a voltage and a current output from the power receiving circuit 1013 (step S105). More specifically, when the power receiving circuit 1013 receives the electric power sent from the DC power supply 1020 through the power transmitting circuit 1001, the power transmitting antenna 1007, and the power receiving antenna 1017, the output detecting circuit 1015 detects the voltage and the current output from the power receiving circuit 1013, and outputs information representing the detected result to the communication circuit 1016. The communication circuit 1016 communicates the result detected by the output detecting circuit 1015 to the frequency range setting unit 1032 and the optimum frequency detecting unit 1031.

After receiving the feedback from the power receiving device 1010, the frequency range setting unit 1032 determines whether the transmission frequency at that time is one of f2a, f1a, and fL1a (step S106). In more detail, it is first determined whether the voltage output from the power receiving circuit 1013 is an extreme value, or whether it reaches a value having increased beyond a local minimum value by a specified rate. If those conditions are both not satisfied, the optimum frequency detecting unit 1031 records the transmission efficiency at that time on a recording medium, e.g., a memory not illustrated, in link to the frequency (step S107). The transmission efficiency can be obtained, for example, by calculating respective electric powers on the power transmitting side and the power receiving side based on both the result (output current and output voltage) detected by the output detecting circuit 1015 and communicated from the communication circuit 1016, and the result (input current and input voltage) detected by the input detecting circuit 1004, and by calculating a ratio between the electric powers. After recording the transmission efficiency and the frequency, the frequency control unit 1030 instructs the power transmitting circuit 1001 to reduce the transmission frequency by a specified value (step S108). If the frequency range setting unit 1032 determines that the output voltage takes an extreme value, a frequency corresponding to the extreme value is f2a or f1a, and hence the frequency at that time is recorded as a frequency providing an local maximum value or a local minimum value (step S109). If it is determined that the output voltage has increased beyond the local minimum value by the specified rate, a corresponding frequency is fL1a, and hence the frequency at that time is recorded as the lower limit of the operation frequency range (step S109). When the initial frequency is a frequency higher than f2a, the frequency that is first recorded is f2a. On the other hand, when the initial frequency is a frequency lower than f2a, the frequency that is first recorded is f1a.

Next, the frequency range setting unit 1032 determines whether the frequency recorded in the preceding step is fL1a (step S110). Because fL1a is set after f1a has been recorded, a loop of the above-mentioned steps is repeated until f1a is recorded.

Here, fL1a is, e.g., a frequency for which an inequality for the output voltage Vo, expressed by the following formula (2), is first satisfied after recording of f1a.

$$Vo(fL1a) Vo(f1a) \times 1.1 \qquad (2)$$

The formula (2) implies that, on the basis of the output voltage Vo(f1a) at the frequency f1a, a frequency at which the output voltage Vo has increased to 1.1 time or more Vo(f1a) is set as the lower limit of the operation frequency range. The magnification of 1.1 time is a value preset through experiments, for example, and is decided in view of unwanted heat generation and the transmission efficiency. Until the frequency fL1a is recorded, the frequency range setting unit 1032 repeats the loop of steps S105 to S110. After the frequency fL1a is recorded, the frequency range setting unit 1032 notifies the values of f2a and fL1a to the optimum frequency detecting unit 1031 (step S111).

Finally, the optimum frequency detecting unit 1031 detects, based on the transmission efficiencies and the frequencies within the frequency range of fL1a to f2a, which have been held until that time, a frequency that provides the maximum transmission efficiency, and notifies the detected frequency to the frequency control unit 1030. The frequency control unit 1030 drives the power transmitting circuit 1001 to start the power transmission at the notified frequency and to continue the power transmission (step S112). After the lapse of a specified time (e.g., several seconds to several minutes) from the start of the power transmission, the processing is returned to step S102 again, and the frequency range setting unit 1032 determines whether the communication is established. Thus, in consideration of a possibility that relative positions of the antennas or the environments around the antennas may vary during the transmission, the operation frequency range is set again at specified time intervals to change the transmission frequency to an optimum value.

As described above, the control circuit 1005 in this embodiment sets the operation frequency range of the power transmitting circuit 1001 in accordance with the result detected by the output detecting circuit 1015 and communicated from the communication circuit 1016, and decides, within the operation frequency range, a frequency of the AC power to be output from the power transmitting circuit in accordance with the results detected by the input detecting circuit 1004 and the output detecting circuit 1015. As a result, the transmission efficiency can be held high in the operation frequency range where the magnetic field intensity is low and safety is ensured.

While the processing illustrated in FIG. 8 represents the example in which the lower limit of the operation frequency range is set to fL1a, the processing can be similarly applied to the case where the lower limit is set to another value, e.g., fL2a. When the frequency fL2a is set as the lower limit instead of the frequency fL1a, the frequency range setting unit 1032 determines, din step S106, whether the frequency is f2a or fL2a. The frequency f2La can be determined, for example, by a method of detecting the local maximum value Vo (f2a) of the output voltage, and then setting, as fL2a, a frequency at which the following formula (3) is satisfied for the first time.

$$Vo(fL2a) \leq Vo(f2a) \times 0.9 \quad (3)$$

Here, the operation executed when the operation frequency range is set between the frequency f1a and f2a will be described with reference to a flowchart of FIG. 18.

First, as in the case of FIG. 8, the power transmitting circuit 1001 converts the DC power, supplied from the DC power supply 1020, to AC power, and sends the AC power to the power receiving device 1010 through the power transmitting antenna 1007 and the power receiving antenna 1017 (step S201). Here, the initial frequency is set to a value sufficiently higher than, e.g., the frequency f2a denoted in FIG. 6A.

Then, the control circuit 1005 receives, from the power receiving device 1010, a voltage value of the DC power that has been output to the load from the power receiving circuit 1013 in the power receiving device (step S202).

Then, the control circuit determines whether the above-mentioned voltage value reaches a specified value (step S203). If the above-mentioned voltage value does not exceed the specified value, the control circuit returns to step S202.

If the above-mentioned voltage value exceeds the specified value, the control circuit controls the power transmitting circuit 1001 to change the frequency of the AC power that is to be transmitted to the power receiving antenna, and records the above-mentioned voltage value during a specified period, as represented in step S204. Then, the control circuit detects the first frequency (f1a) corresponding to a local minimum value and the second frequency (f2a) corresponding to a local maximum value.

The control circuit determines whether the specified period has lapsed from step S203 (step S205). If the specified period has not yet lapsed, the processing is returned to step S204. Here, the specified period is set to a period enough to find the first frequency (f1a) and the second frequency (f2a).

After the lapse of the specified period, the frequency of the AC power to be transmitted to the power receiving antenna is set to a frequency between the first frequency (f1a) and the second frequency (f2a), and the power transmission is performed (step S206).

If a specified time has further lapsed from step S206, the control circuit returns to step S202 and executes a new search. If the specified time has not yet lapsed, the control circuit returns to step S206 (step S207).

Shift to step S206 is made after the lapse of the above-mentioned specified period that is set to a period enough to find the first frequency (f1a) and the second frequency (f2a). However, the shift to step S206 may be made at timing of finding of the first frequency (f1a) and the second frequency (f2a) when the first frequency (f1a) and the second frequency (f2a) are detected each time the frequency of the AC power is changed in step S204.

Second Embodiment

Figure 9:
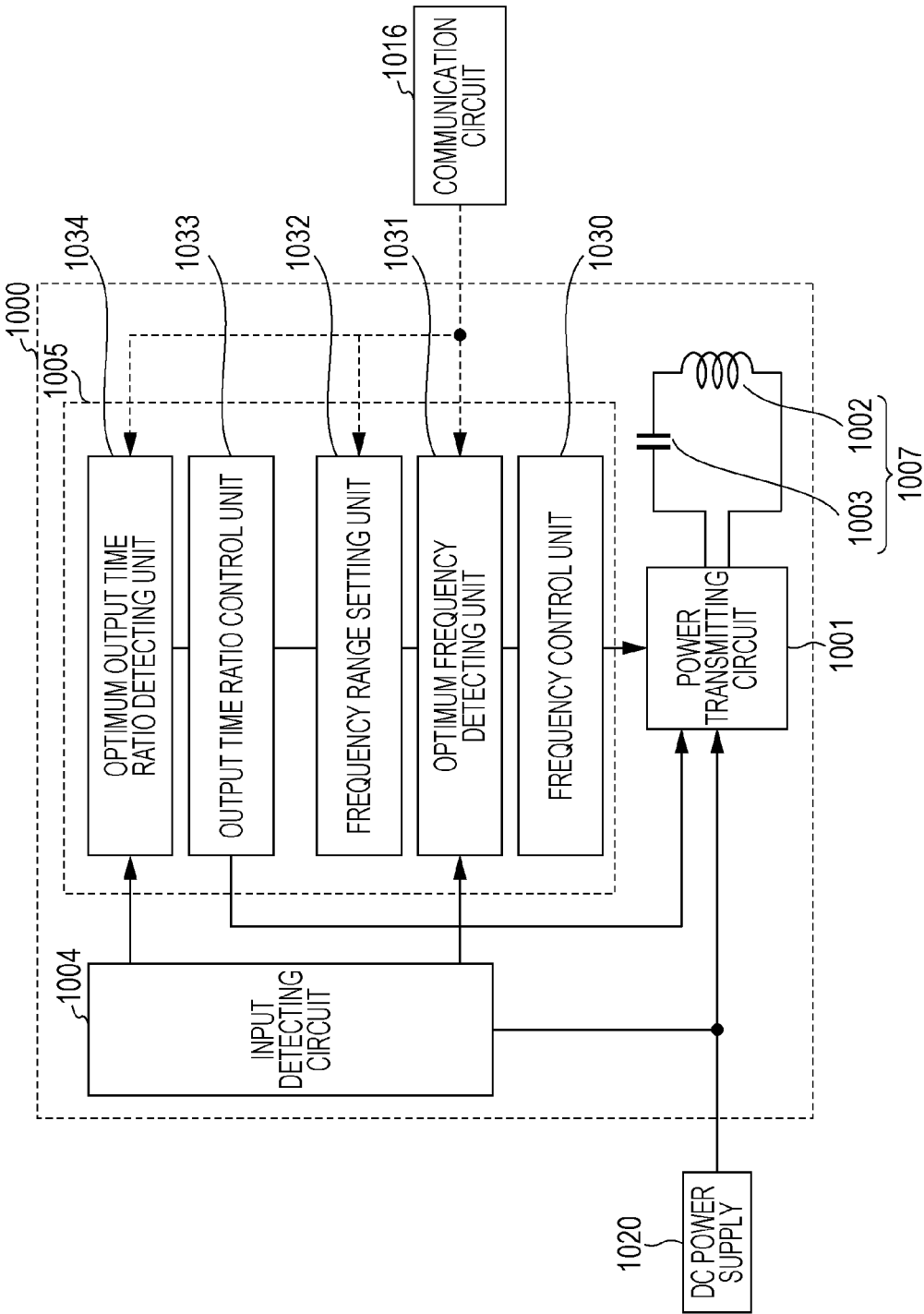
FIG. 9 is a block diagram illustrating detailed configuration of a power transmitting device according to a second embodiment.

FIG. 9 is a block diagram illustrating detailed configuration of a power transmitting device 1000 according to a second embodiment of the present disclosure. In FIG. 9, components in common or corresponding to those in FIG. 5 are denoted by the same reference numerals, and description of common matters is not repeated.

In this embodiment, the control circuit 1005 controls an output time ratio of the voltage, which is output from the power transmitting circuit 1001, such that the voltage output from the power receiving circuit 1013 is maintained at constant. The control circuit 1005 in this embodiment further includes an output time ratio control unit 1033 and an optimum output time ratio detecting unit 1034. The output time ratio control unit 1033 controls the output time ratio of the voltage, which is output from the power transmitting circuit 1001. The DC voltage output from the power receiving circuit 1013 can be changed by changing the output time ratio of the output voltage of the power transmitting circuit 1001. Here, the term "output time ratio" of the voltage implies a proportion of a time during which a voltage having an absolute value larger than a specified value (e.g., about several % to 20% of the amplitude) is output, with respect to one period. The output time ratio can be controlled by adjusting at least one of the duty ratio and the phase of a pulse that is input to each of plural switching elements from the power transmitting circuit 1001.

FIG. 10A illustrates an example of configuration of the power transmitting circuit 1001. The power transmitting circuit 1001 in this example includes an oscillation circuit 1008 in full-bridge arrangement having four switching elements S1 to S4, and a pulse output circuit 1009 that generates pulses input respectively to the switching elements. The switching elements may be each implemented as a field effect transistor, e.g., MOSFET (Metal Oxide Semiconductor Field Effect Transistor). Each switching element can be brought into a conduction state when the pulse output circuit 1009 applies a pulse to a gate of the switching element. In the following description, a state where a voltage is applied to the gate of each switching element and a current is allowed to flow is called "on", and a state where no voltage is applied and a current is not allowed to flow is called "off".

The four switching elements S1 to S4 are constituted by a pair of switching elements (S1 and S4) each of which outputs, in the conduction state, a voltage having the same polarity as that of the input voltage from the DC power supply 1020, and by a pair of switching elements (S2 and S3) each of which outputs, in the conduction state, a voltage having polarity reversed to that of the input voltage. The input DC voltage can be converted to an AC voltage by alternately repeating, at a specified frequency, a state where the switching elements S1 and S4 are turned on, and a state where the switching elements S2 and S3 are turned off. In fact, though not illustrated in FIG. 10A, there may be additionally provided one or more other components, such as a filter circuit that smoothens the current output from the power transmitting circuit 1001 and inputs an alternating current in the form of a sine wave to the power transmitting antenna 1007.

Figure 10B:
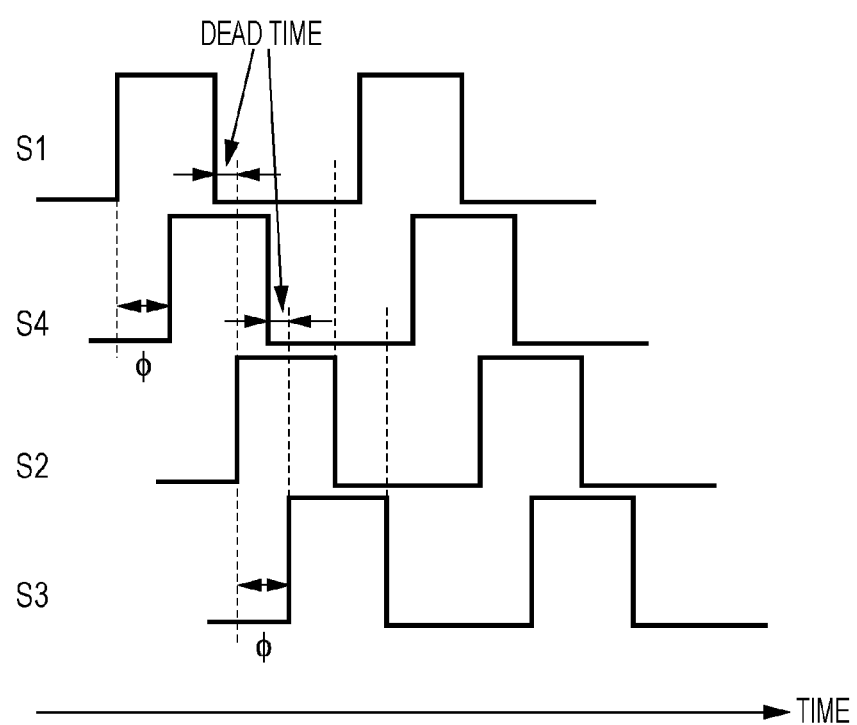
FIG. 10B is a chart to explain a phase shift between pulses input to switching elements.

FIG. 10B is a chart diagrammatically illustrating one example of timings of the pulses input to the switching elements S1 to S4. A phase shift $\phi$ represents a shift between a phase of the pulse input to the switching element S1 and a phase of the pulse input to the switching element S4, or a shift between a phase of the pulse input to the switching element S2 and a phase of the pulse input to the switching element S3. The output time ratio can be adjusted by varying the phase shift $\phi$ in the range of 0 to 90 degrees. In the example illustrated in FIG. 10B, the pulse output circuit 1009 outputs, to the switching element S2, an inverted pulse that is inverted from the pulse input to the switching element S1, and that has a certain off-time (called "dead time") during which the pulses input to the switching elements S1 and S2 are turned off simultaneously. Likewise, the pulse output circuit 1009 outputs, to the switching element S4, an inverted pulse that is inverted from the pulse input to the switching element S3, and that has a certain off-time during which the pulses input to the switching elements S3 and S4 are turned off simultaneously. The reason why the dead time is set between the two pulses input to the switching elements S1 and S2 and between the two pulses input to the switching element S3 and S4 resides in reducing a risk that the switching elements S1 and S2 or the switching elements S3 and S4 may be simultaneously turned on at the moments of a rise and a fall of the two pulses, thus causing short-circuiting at the load and damaging the switching elements. For that reason, in the example illustrated in FIG. 10B, the duty ratio of each pulse is set to a value smaller than 50%. However, setting the dead time is not essential, and the duty ratio of each pulse may be 50%.

Figure 11A:
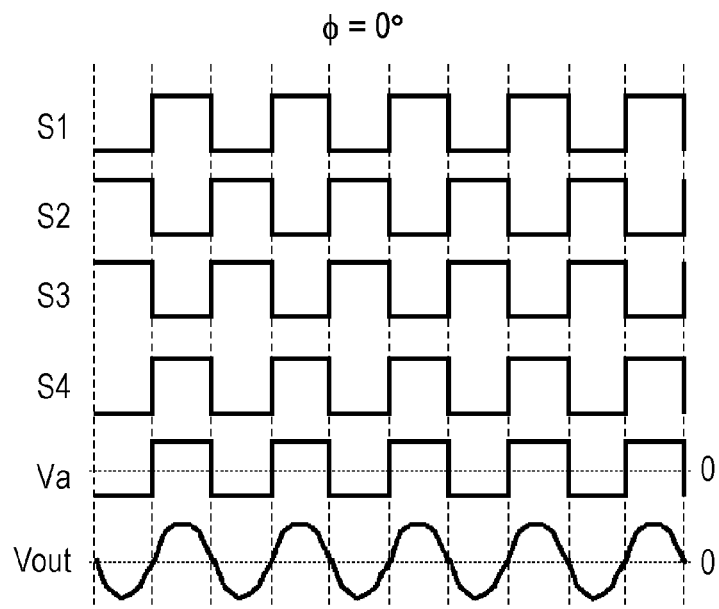
FIG. 11A illustrates an example of waveforms of pulse voltages and the output voltage when the amount of phase shift is 0 degree.
Figure 11B:
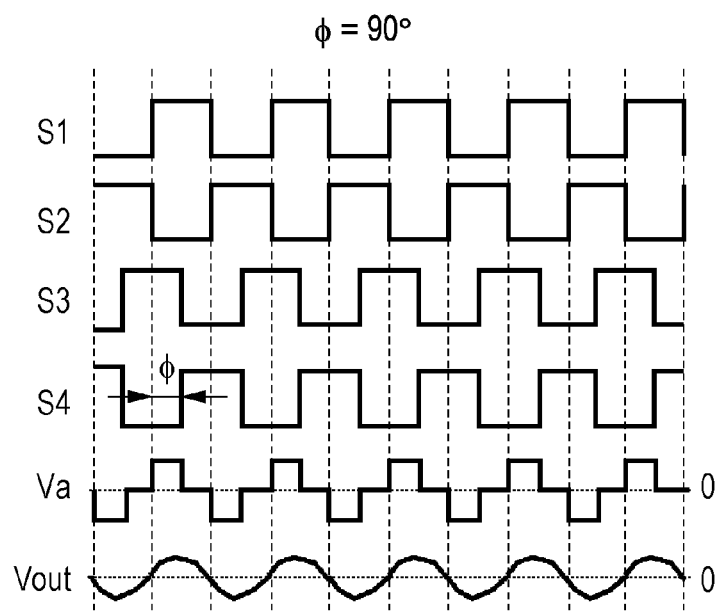
FIG. 11B illustrates an example of waveforms of the pulse voltages and the output voltage when the amount of phase shift is 90 degrees.

FIGS. 11A and 11B are charts diagrammatically illustrating examples of timings of the pulses input to the switching elements S1 to S4 when the dead time is not set. FIG. 11A illustrates examples of respective waveforms of pulse voltages applied to the switching elements S1 to S4, a voltage Va output from the power transmitting circuit 1001, and a voltage Vout resulting from converting the voltage Va to a sine wave when there is no phase shift ($\phi$=0). FIG. 11B illustrates examples of respective waveforms of the above-mentioned voltages when the phase shift is 90 degrees ($\phi$=90°). As seen from FIGS. 11A and 11B, the output time ratio of the output AC voltage Va and the amplitude of the sine-wave voltage Vout can be reduced by increasing the phase shift $\phi$ from 0 degree.

Figure 12A:
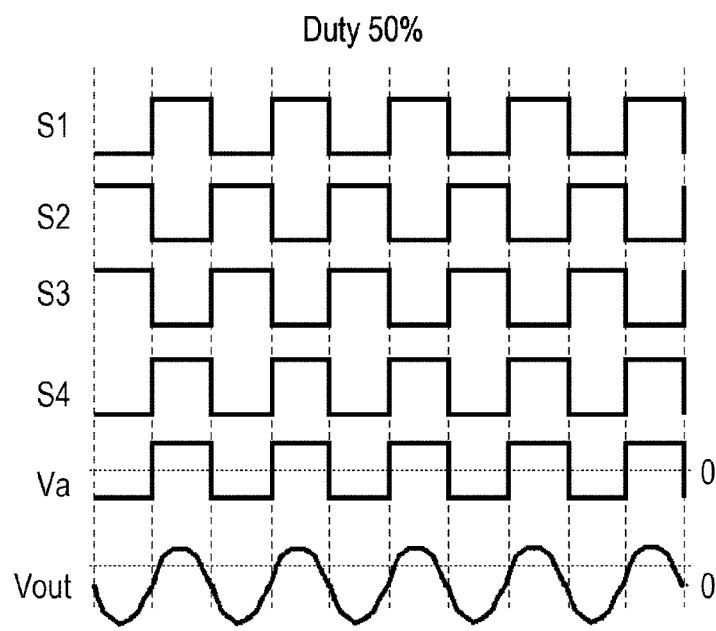
FIG. 12A illustrates an example of waveforms of the pulse voltages and the output voltage when a duty ratio is 50%.
Figure 12B:
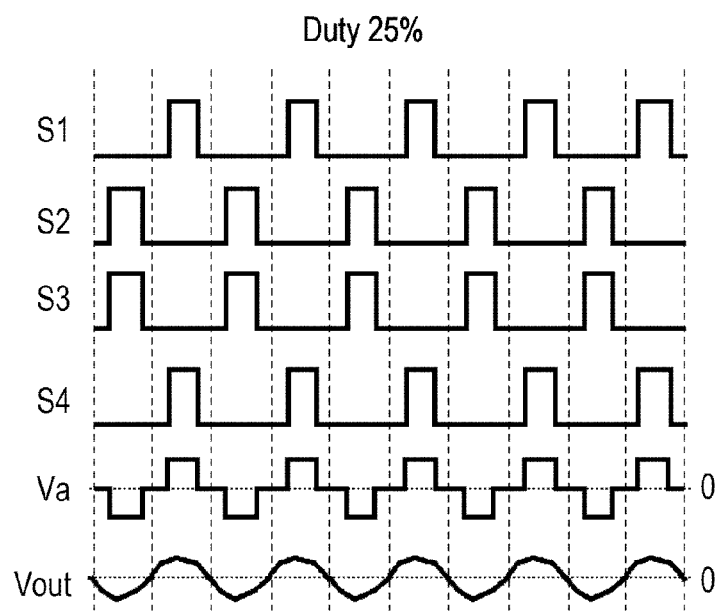
FIG. 12B illustrates an example of waveforms of the pulse voltages and the output voltage when the duty ratio is 25%.

The output time ratio may be changed by varying the duty ratio of the pulse instead of varying the phase shift $\phi$ of the pulse. FIG. 12A illustrates examples of respective waveforms of the pulse voltages applied to the switching elements S1 to S4, the voltage Va output from the power transmitting circuit 1001, and the voltage Vout resulting from converting the voltage Va to a sine wave when the duty ratio is 50%. FIG. 12B illustrates examples of respective waveforms of the above-mentioned voltages when the duty ratio is 25%. As seen from FIGS. 12A and 12B, the output time ratio of the output AC voltage Va and the amplitude of the sine-wave voltage Vout can be reduced by reducing the duty ratio from 50%. In other words, a maximum output is obtained when the duty ratio is 50%, and the output can be adjusted by reducing the duty ratio to an arbitrary value smaller than 50%.

The control circuit 1005 can change the output time ratio of the voltage, which is output from the power transmitting circuit 1001, by controlling the pulse output circuit 1009 to change the phase shift $\phi$ or the duty ratio of the pulse. In accordance with the result detected by the output detecting circuit 1015 and communicated from the communication circuit 1016, the optimum output time ratio detecting unit 1034 decides the output time ratio of the voltage, which is output from the power transmitting circuit 1001, such that the output voltage of the power receiving circuit 1013 comes closer to the specified value. The output time ratio control unit 1033 controls the phase shift $\phi$ or the duty ratio such that the decided output time ratio is obtained. Thus, the DC voltage supplied to the load 1014 can be adjusted to the specified value without incorporating the DC/DC converter in the power receiving device 1010, and a loss of electric power consumed by the DC/DC converter can be avoided.

A method of setting the frequency range by the frequency range setting unit 1032 in this embodiment will be described below. In this embodiment, control for making the output voltage of the power receiving circuit 1013 closer to the specific value is executed by changing the output time ratio of the voltage output from the power transmitting circuit 1001. Thus, the frequency range is unable to set by employing the output voltage of the power receiving circuit 1013 as an index. In this embodiment, therefore, the frequency range is set by employing, as an index, the output time ratio obtained when the output voltage of the power receiving circuit 1013 is maintained at the specified value (hereinafter referred to also as the "optimum output time ratio"). The frequency range setting unit 1032 sweeps the transmission frequency and determines the frequency range based on a frequency at which the optimum output time ratio decided by the optimum output time ratio detecting unit 1034 at each sweep frequency takes a local maximum value or a local minimum value.

Figure 13:
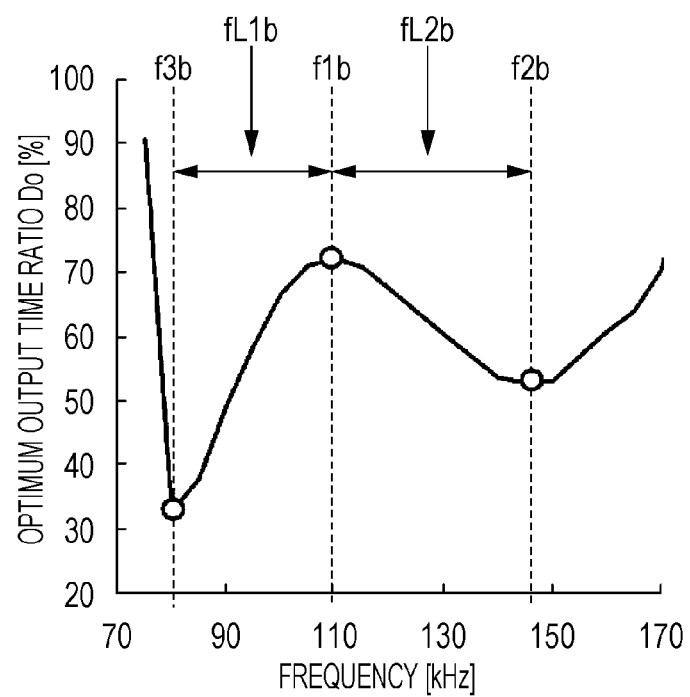
FIG. 13 is a graph depicting relation between an output time ratio and transmission frequency when the output voltage is maintained at a specified value in the second embodiment.

FIG. 13 is a graph depicting relation between the optimum output time ratio decided by the optimum output time ratio detecting unit 1034 and the transmission frequency. Circuit constants are the same as those in the first embodiment, and a different point from the first embodiment is just in controlling the output time ratio and maintaining the output voltage of the power receiving circuit 1013 at 4.2 V. In FIG. 13, an optimum output time ratio Do takes a local maximum value at a frequency f1b, a first local minimum value at a frequency f2b higher than the frequency f1b, and a second local minimum value at a frequency f3b lower than the frequency f1b. The waveform illustrated in FIG. 13 exhibits a tendency that is reversed to the characteristics of the output voltage Vo in the first embodiment. Therefore, the control described in the first embodiment can be similarly applied by replacing the frequencies f1a, f2a and f3a in the first embodiment with the frequencies f1b, f2b and f3b, respectively, and by exchanging the local maximum value and the local minimum value. In this embodiment, the lower limit of the operation frequency range may be set to, e.g., a value of a frequency fL1b that satisfies f3b<fL1b≤f1b, or a value of a frequency fL2b that satisfies f1b<fL2b<f2b. The upper limit of the operation frequency range may be set to, e.g., the frequency f2b.

In accordance with the result detected by the input detecting circuit 1004, the optimum frequency detecting unit 1031 decides, within the operation frequency range having been set by the frequency range setting unit 1032, a frequency at which the transmission efficiency is maximized. The frequency control unit 1030 controls the power transmitting circuit 1001 such that the frequency decided by the optimum frequency detecting unit 1031 is obtained. At that time, the DC voltage supplied to the load 1014 being operated at the optimum output time ratio Do, illustrated in FIG. 13, is maintained at the specified value. Accordingly, when the DC power supply 1020 is a constant voltage source, the transmission efficiency in the entire wireless power transmission system can be maximized by setting the input current from the DC power supply 1020 to minimum when the system is operated at the optimum output time ratio Do. On the other hand, when the DC power supply 1020 is a constant current source, the transmission efficiency in the entire wireless power transmission system can be maximized by setting the input voltage from the DC power supply 1020 to minimum when the system is operated at the optimum output time ratio Do. Stated in another way, in this embodiment, the operation frequency can be decided in accordance with just information of the current or the voltage in the result detected by the input detecting circuit 1004 without employing the result detected by the output detecting circuit 1015 and communicated from the communication circuit 1016. As a result, processing can be executed at a higher speed than in the case of maximizing the transmission efficiency that is calculated from both the input power calculated from the result detected by the input detecting circuit 1004 and the output power calculated from the result detected by the output detecting circuit 1015, and a convergent time taken for maximizing the transmission efficiency can be shortened. Thus, in this embodiment, the input detecting circuit 1004 is just demanded to have the function of detecting at least one of the current and the voltage, and the output detecting circuit 1015 is just demanded to have the function of detecting the output voltage of the power receiving circuit 1013, which is employed to decide the output time ratio.

A control method executed by the control circuit 1005 in this embodiment will be described below.

Figure 14:
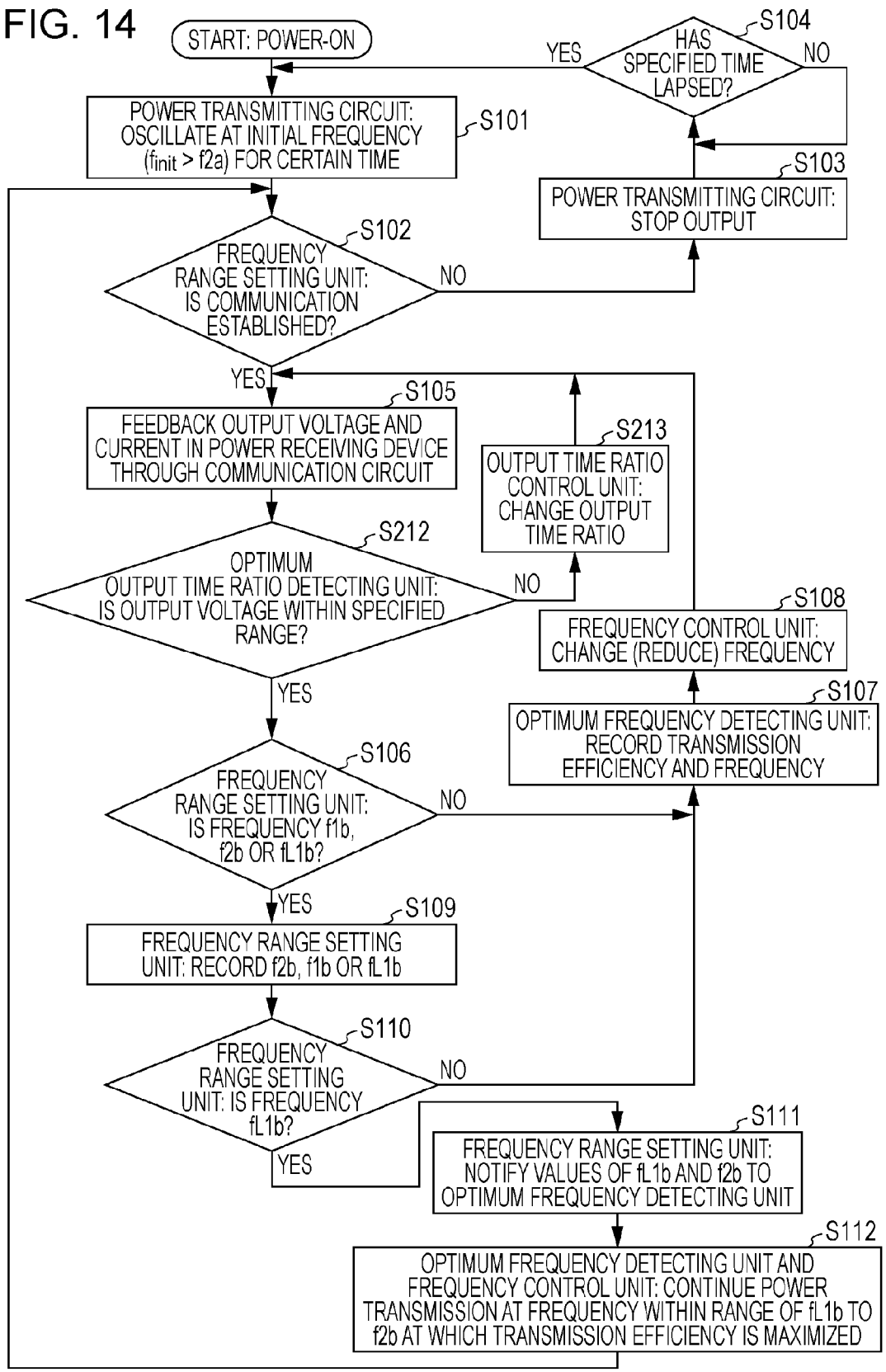
FIG. 14 is a flowchart illustrating processing in accordance with a control method in the second embodiment.

FIG. 14 is a flowchart illustrating the control method in this embodiment. Operation in accordance with the control method in this embodiment is in common to the operation, illustrated in FIG. 8, except for that steps S212 and S213 are added to the control in the first embodiment illustrated in FIG. 8, and that the frequencies f1a, f2a and fL1a are replaced with the frequencies f1b, f2b and fL1b, respectively. Hence the following description is made mainly about a different point from the operation illustrated in FIG. 8. In this control method, because the power transmitting device 1000 executes the control for maintaining the output voltage Vo at the specified value, the operation frequency range is unable to decide in accordance with the output voltage Vo. Accordingly, the operation frequency range is decided in accordance with the optimum output time ratio.

According to this control method, after the initial transmission has been performed in step S101 and the processing of steps S102 to S105 has been executed as in the first embodiment, the optimum output time ratio detecting unit 1034 determines whether the voltage applied to the load 1014 is within a specified range (step S212). The optimum output time ratio detecting unit 1034 first calculates a difference between the output voltage detected on the power receiving side and a preset target voltage to be output, and then determines whether the difference is within a specified range. If the difference is within the specified range, the processing is transited to the frequency range setting unit 1032. On the other hand, if the difference is outside the specified range, the output time ratio control unit 1033 executes processing to change the output time ratio D (step S213). On that occasion, the optimum output time ratio detecting unit 1034 decides a change width ΔD of the output time ratio D, and outputs the decided information to the output time ratio control unit 1033. Here, when a current value of the output voltage is higher than the target voltage value, ΔD takes a negative value, and when it is lower than the target voltage value, ΔD takes a positive value. ΔD may be a constant value or may be provided as an optimum output time ratio that is obtained from respective values of the output voltage and the load, and that is previously stored in the form of a table in a memory, for example.

The output time ratio control unit 1033 obtains a new output time ratio (D+ΔD) from the present output time ratio D and the change width ΔD of the output time ratio, and outputs the obtained information to the power transmitting circuit 1001. The power transmitting circuit 1001 outputs an AC voltage corresponding to the new output time ratio (D+ΔD). After return to step S105, the processing to change the output time ratio D is executed in step S212 until the optimum output time ratio detecting unit 1034 determines that the difference between the output voltage and the target voltage value is within the specified range.

If the determination in step S212 is "Yes", the processing is advanced to step S106. Because the output voltage Vo is held at a constant value at the time when step S106 is executed, the output voltage Vo is not usable as an index in detecting the frequencies f2b, f1b and fL1b. In this control method, therefore, the frequency detection is performed by employing, as an index, the optimum output time ratio Do that has been decided by the optimum output time ratio detecting unit 1034. As seen from FIG. 13, control can be executed in a similar manner to that in the first embodiment by detecting extreme values of the optimum output time ratio Do. A different point from the control in the first embodiment is that the loop (steps S105, S212 and S213) searching for the optimum output time ratio Do is executed each time the frequency is changed in step S108.

As described above, according to this control method, the optimum output time ratio detecting unit 1034 first detects the output time ratio at which the output voltage of the power receiving circuit 1013 comes closer to the target voltage value, and the frequency range setting unit 1032 then detects the operation frequency range in which safety is ensured. Finally, the optimum frequency detecting unit 1031 detects the transmission frequency at which the transmission efficiency has a peak value. As a result, outputting of the constant voltage, safety, and high transmission efficiency can be realized at the same time.

Third Embodiment

Figure 15:
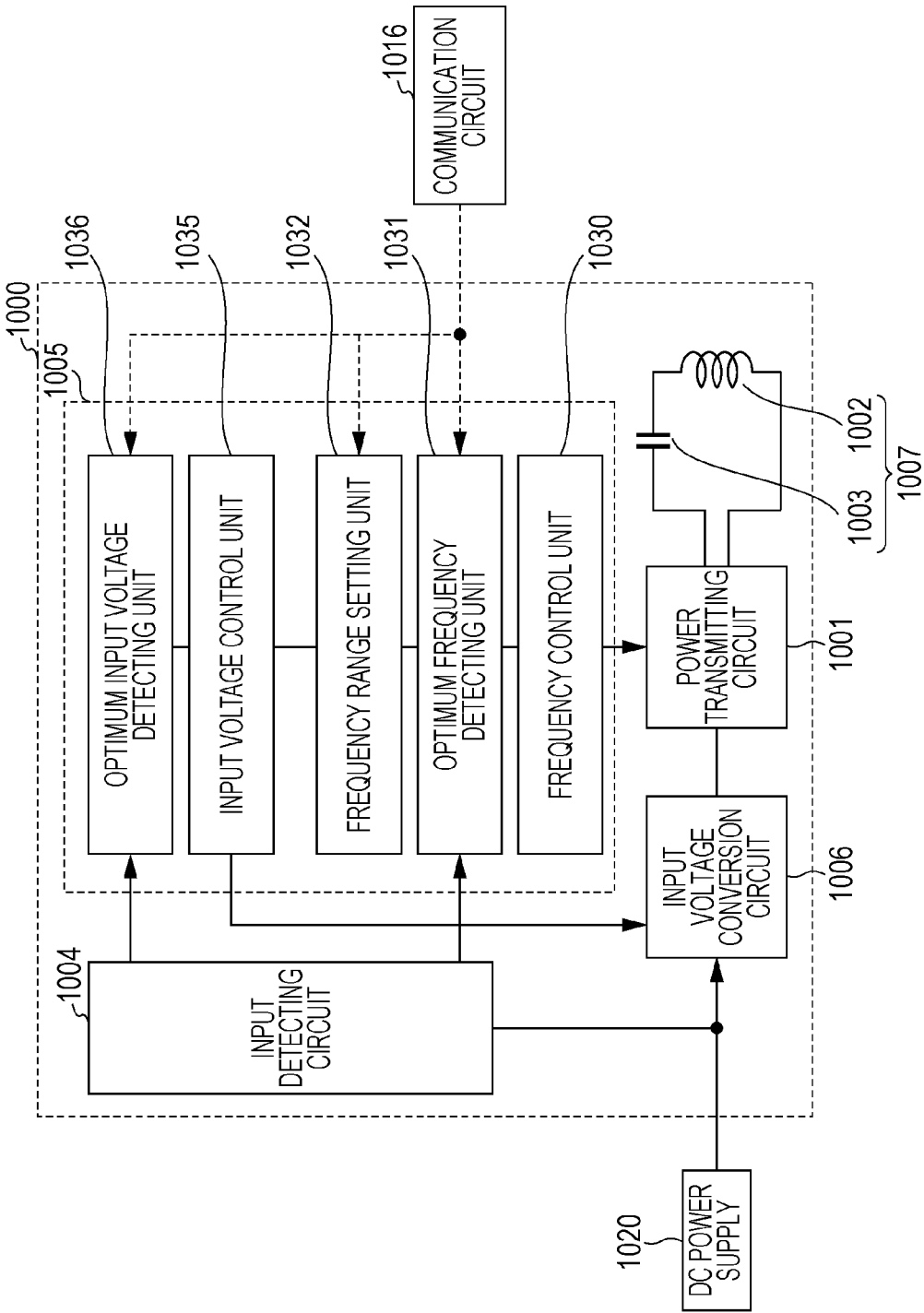
FIG. 15 is a block diagram illustrating detailed configuration of a power transmitting device according to a third embodiment.

FIG. 15 is a block diagram illustrating detailed configuration of a power transmitting device 1000 according to a third embodiment of the present disclosure. In FIG. 15, components in common or corresponding to those in FIG. 9 are denoted by the same reference numerals, and description of common matters is not repeated.

The power transmitting device 1000 in this embodiment further includes an input voltage conversion circuit 1006 connected between the DC power supply 1020 and the power transmitting circuit 1001. The input voltage conversion circuit 1006 can change the magnitude of the DC voltage supplied to the power transmitting circuit 1001. The control circuit 1005 further includes an input voltage control unit 1035 that controls the voltage input from the input voltage conversion circuit 1006 to the power transmitting circuit 1001 (hereinafter referred to as the "input voltage"), and an optimum input voltage detecting unit 1036 that decides an optimum input voltage.

The input voltage conversion circuit 1006 can be implemented as a DC/DC converter that is known in the art. In this embodiment, the phase shift and the duty ratio of the pulse input to each switching element in the power transmitting circuit 1001 are held at fixed values, and the amplitude of the voltage output from the power transmitting circuit 1001 is adjusted by changing the DC voltage, which is input to the power transmitting circuit 1001, with the input voltage conversion circuit 1006. The input voltage conversion circuit 1006 can be constituted by employing, e.g., a non-isolated converter using a choke coil, or an isolated converter using a transformer, which is known in the art.

The input voltage control unit 1035 can change the output voltage of the power receiving circuit 1013 by controlling the input voltage conversion circuit 1006. A voltage output from the input voltage conversion circuit 1006 can be changed, for example, by a method of adjusting input timing of a pulse to a switching element that is included in the input voltage conversion circuit 1006. In accordance with the result detected by the output detecting circuit 1015 and communicated from the communication circuit 1016, the optimum input voltage detecting unit 1036 decides the voltage output from the input voltage conversion circuit 1006 such that the output voltage of the power receiving circuit 1013 comes closer to the specified value. A method of deciding such an optimum input voltage is similar to the method of deciding the optimum output time ratio in the second embodiment.

A method of setting the operation frequency range by the frequency range setting unit 1032 in this embodiment will be described below. The method of setting the operation frequency range by the frequency range setting unit 1032 in this embodiment is the same as the method executed in the second embodiment, illustrated in FIG. 14, except for that the "output time ratio" of the output voltage of the power transmitting circuit 1001 is replaced with the "input voltage" to the power transmitting circuit 1001.

Figure 16:
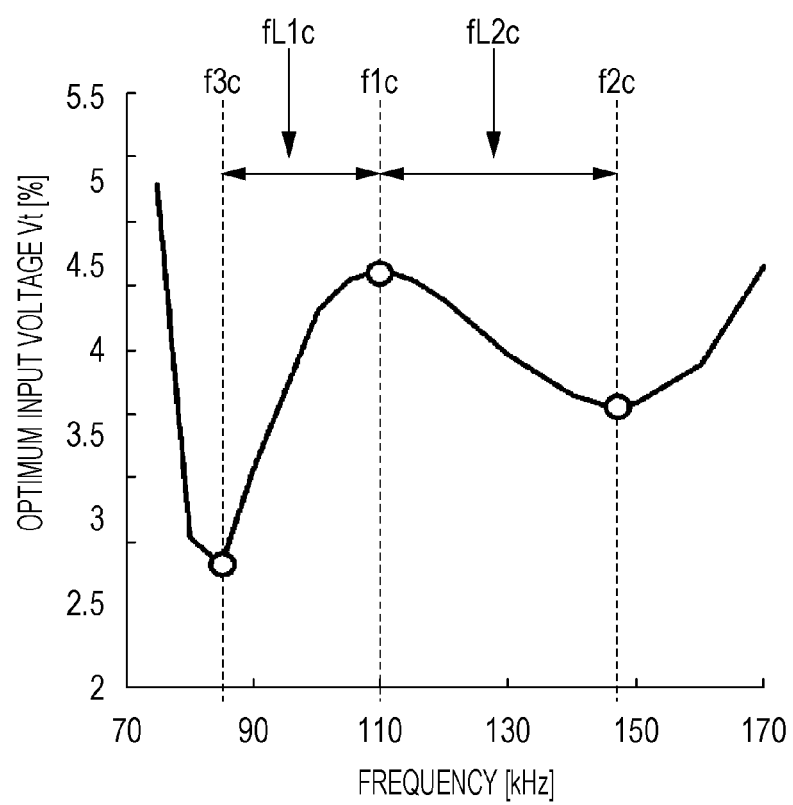
FIG. 16 is a graph depicting relation between output voltage of a DC/DC converter and transmission frequency when the output voltage is maintained at a specified value in the third embodiment.

FIG. 16 is a graph depicting relation between an optimum input voltage Vt decided by the optimum input voltage detecting unit 1036 and transmission frequency. Circuit constants are the same as those in the first embodiment, and a different point from the first embodiment is just in controlling the input voltage to maintain the output voltage of the power receiving circuit 1013 at 4.2 V. In FIG. 16, the optimum input voltage Vt takes a local maximum value at a frequency f1c, a first local minimum value at a frequency f2c higher than the frequency f1c, and a second local minimum value at a frequency f3c lower than the frequency f1c. As in the second embodiment, the waveform illustrated in FIG. 16 exhibits a tendency that is reversed to the characteristics of the output voltage Vo in the first embodiment. Therefore, the control described in the first embodiment can be similarly applied by replacing the frequencies f1a, f2a and f3a in the first embodiment with the frequencies f1c, f2c and f3c, respectively, and by exchanging the local maximum value and the local minimum value. In this embodiment, the lower limit of the operation frequency range may be set to, e.g., a value of a frequency fL1c that satisfies f3c<fL1c≤f1c, or a value of a frequency fL2c that satisfies f1c<fL2c<f2c. The upper limit of the operation frequency range may be set to, e.g., the frequency f2c.

As described above, in any one of the first to third embodiments, control can be executed in a similar manner.

Other Embodiments

The first to third embodiments have been described above as examples of the techniques according to the present disclosure. The techniques according to the present disclosure are not limited to the above-described embodiments, and they can be applied to other embodiments that are practiced through modification, replacement, addition, omission, etc. as appropriate. Furthermore, the individual components described in the first to third embodiments can be combined so as to provide new embodiments. Those other embodiments will be described below by way of example.

While the operations of the forgoing embodiments have been described, by way of example, with reference to FIGS. 8 and 14, the operations are not limited to the above-described examples and may be modified as appropriate. For example, the intermittent operation executed in steps S101 to S104 may be omitted. In the control method illustrated in FIG. 14, the optimum output time ratio or the optimum input voltage may be searched for while maintaining the frequency at which high transmission efficiency is obtained, instead of searching for the frequency at which high transmission efficiency is obtained while the output voltage on the power receiving side is maintained constant. Even when the control sequence is modified as mentioned above, a similar advantageous effect can be obtained. The modification is not limited to the above example, and the control circuit is just constituted to be able to set the operation frequency range of the power transmitting circuit in accordance with the result detected by the output detecting circuit and communicated from the communication circuit, and to decide, within the set operation frequency range, the frequency of the AC power, which is output to the power transmitting circuit, in accordance with the result detected by the input detecting circuit.

Figure 17:
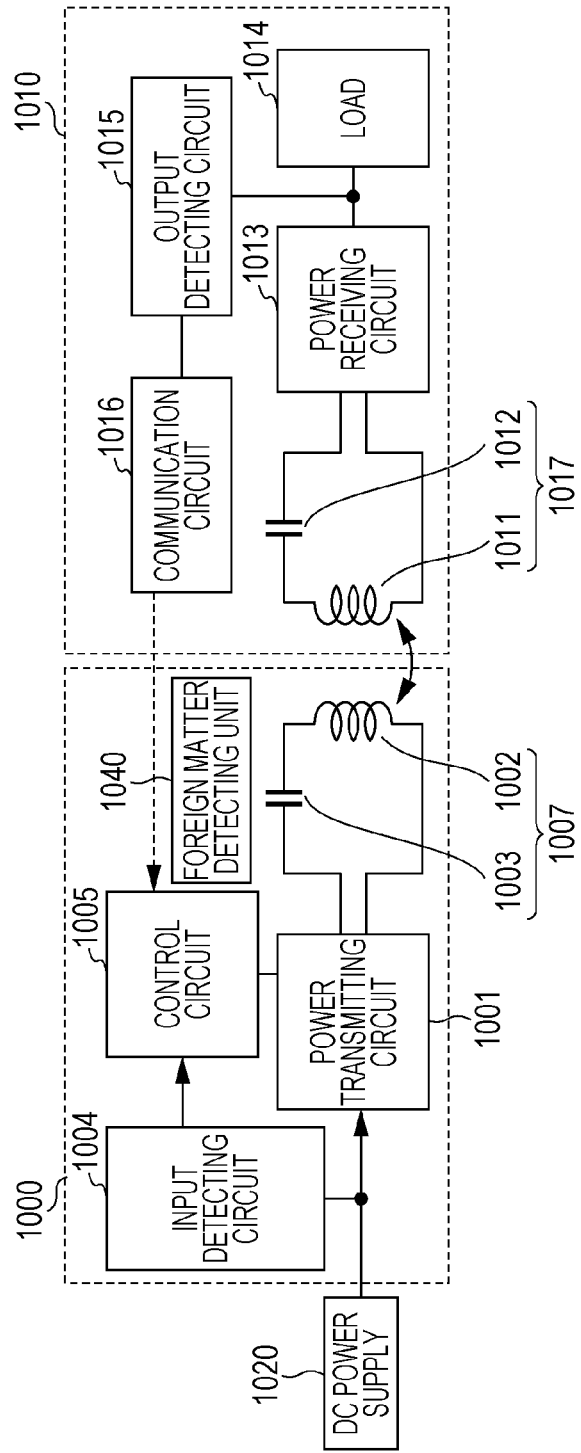
FIG. 17 illustrates an example of a power transmitting device equipped with a foreign-matter detecting circuit.

The power transmitting device 1000 may further include a foreign matter detecting circuit that detects a foreign matter present around the power transmitting antenna 1007 and the power receiving antenna 1017. FIG. 17 is a block diagram illustrating an example of such a wireless power transmission system. A voltage or a current in the power transmitting antenna 1007 is changed when a metallic foreign matter is present close to the antenna. A foreign matter detecting circuit 1040 detects the change of the voltage or the current, thereby detecting a foreign matter. The control circuit 1005 may execute control, for example, in such a manner of setting the operation frequency range with the frequency fL2a, fL2b or fL2c set as the lower limit just when the foreign matter detecting circuit 1040 detects the foreign matter, and not setting the operation frequency range otherwise. Alternatively, the control may be executed in such a manner of usually setting the frequency fL1a, fL1b or fL1c to the lower limit of the operation frequency range, and setting the frequency fL2a, fL2b or fL2c to the lower limit just when the foreign matter is present close to the antenna. With the control mentioned above, a wireless power transmission system can be realized in which the transmission efficiency is maintained high when the foreign matter is not present, and the principal emphasis is paid to safety when the foreign matter is present nearby.

(Recapitulation of Features According to Various Aspects of Present Disclosure)

As seen from the above description, the present disclosure involves the following features according to various aspects.

According to a first aspect, the techniques disclosed here feature a power transmitting device, which transmits AC power in a noncontact manner to a power receiving device comprising a power receiving antenna, a power receiving circuit that converts the AC power received by the power receiving antenna to first DC power, and a load to which the first DC power is output from the power receiving circuit, the power transmitting device comprising:

a power transmitting circuit that converts second DC power input from a DC power supply to AC power;

a power transmitting antenna that transmits the AC power output from the power transmitting circuit to the power receiving antenna; and a control circuit that receives, from the power receiving device, a voltage value of the first DC power output from the power receiving circuit to the load in the power receiving device, wherein the control circuit controls the power transmitting circuit to change a frequency of the AC power that is transmitted to the power receiving antenna, detects, from the received voltage values, a first frequency corresponding to a local minimum value of the voltage values and a second frequency corresponding to the voltage value that takes a local maximum value at a frequency higher than the first frequency, and sets the frequency of the AC power transmitted to the power receiving antenna to a frequency between the first frequency and the second frequency.

With the first aspect, the control circuit detects, from the received voltage values, a first frequency corresponding to a local minimum value of the voltage values and a second frequency corresponding to the voltage value that takes a local maximum value at a frequency higher than the first frequency. Then, the control circuit sets the frequency of the AC power transmitted to the power receiving antenna to a frequency between the first frequency and the second frequency. Therefore, the magnetic field intensity can be reduced, and the power transmission can be performed in a safe and highly-efficient manner. As a result, even when a metallic foreign matter enters between the power transmitting antenna and the power receiving antenna, or even when a metallic part is arranged around the power transmitting antenna or the power receiving antenna, it is possible to suppress heat generation from the metallic foreign matter or the metallic part caused by the magnetic fields generated from both the antennas, and to realize safe power transmission while the transmission efficiency is maintained at a certain or higher level.

According to a second aspect, the techniques disclosed here feature a power transmitting device, which transmits AC power in a noncontact manner to a power receiving device comprising a power receiving antenna, a power receiving circuit that converts the AC power received by the power receiving antenna to first DC power, and a load to which the first DC power is output from the power receiving circuit, the power transmitting device comprising:

a power transmitting circuit that converts second DC power input from a DC power supply to AC power;

a power transmitting antenna that transmits the AC power output from the power transmitting circuit to the power receiving antenna; and a control circuit that receives, from the power receiving device, a voltage value of the first DC power output from the power receiving circuit to the load in the power receiving device, wherein the control circuit controls the power transmitting circuit to change a frequency of the AC power, which is transmitted to the power receiving antenna, in a state where a DC voltage of the first DC power output from the power receiving circuit is maintained at a specified value, detects a frequency f1b corresponding to a local maximum value of an output time ratio of an AC voltage output from the power transmitting circuit, and a frequency f2b corresponding to a local minimum value of the output time ratio, the frequency f2b being higher than the frequency f1b, and sets the frequency of the AC power transmitted to the power receiving antenna to a frequency between the frequency f1b and the frequency f2b.

According to a third aspect, the techniques disclosed here feature a power transmitting device, which transmits AC power in a noncontact manner to a power receiving device comprising a power receiving antenna, a power receiving circuit that converts the AC power received by the power receiving antenna to first DC power, and a load to which the first DC power is output from the power receiving circuit, the power transmitting device comprising:

an input voltage conversion circuit that changes a magnitude of a voltage of second DC power input from a DC power supply;

a power transmitting circuit that converts third DC power output from the input voltage conversion circuit to AC power;

a power transmitting antenna that transmits the AC power output from the power transmitting circuit to the power receiving antenna; and a control circuit that receives, from the power receiving device, a voltage value of the first DC power output from the power receiving circuit to the load in the power receiving device, wherein the control circuit controls the power transmitting circuit to change a frequency of the AC power, which is transmitted to the power receiving antenna, in a state where a DC voltage of the first DC power output from the power receiving circuit is maintained at a specified value, detects a frequency f1c corresponding to a local maximum value of an output voltage of the input voltage conversion circuit, and a frequency f2c corresponding to a local minimum value of the output voltage, the frequency f2c being higher than the frequency f1c, and sets the frequency of the AC power transmitted to the power receiving antenna to a frequency between the frequency f1c and the frequency f2c.

According to a fourth aspect, in the power transmitting device according to any one of the first to third aspects, the power transmitting device may further comprise an input detecting circuit that detects at least one of a current and a voltage input to the power transmitting device, and the control circuit may change, in accordance with a result detected by the input detecting circuit, a frequency within the operation frequency range of the AC power to minimize the input current when the DC voltage output from the power receiving circuit is maintained at a specified value.

According to a fifth aspect, in the power transmitting device according to any one of the first to fourth aspects, the control circuit may change the frequency of the AC power during a specified period after the voltage value has reached a specified value, may detect the first frequency and the second frequency from the voltage values received during the specified period, and may set the frequency of the AC power to a frequency between the first frequency and the second frequency after the specified period has lapsed.

When the power receiving antenna starts to receive the AC power output from the power transmitting circuit, the voltage of the first DC power output from the power receiving circuit to the load rises gradually. Corresponding to such a rise of the voltage of the first DC power, the voltage value received by the control circuit also rises.

With the fifth aspect, when the voltage value reaches the specified value, the control circuit comes into a state ready for receiving the voltage value. Thereafter, the control circuit changes the frequency of the AC power during the specified period. The control circuit records the input voltage value during the specified period. The specified period is set to a period enough to detect the first frequency and the second frequency. After the specified period has lapsed, the control circuit detects the first frequency and the second frequency from the voltage values received during the specified period. Then, the control circuit sets the frequency of the AC power to a frequency between the detected first frequency and second frequency.

Thus, in a stage before the power transmitting device transmits the AC power to the power receiving device in a noncontact manner, the first frequency and the second frequency are detected properly. Accordingly, at the time when the power transmitting device transmits the AC power to the power receiving device in a noncontact manner, the AC power can be transmitted by employing the frequency between the first frequency and the second frequency that have been detected properly. As a result, the magnetic field intensity can be reduced, and the power transmission can be performed in a safe and highly-efficient manner.

According to a sixth aspect, in the power transmitting device according to any one of the first to fifth aspects, the control circuit may set the frequency of the AC power to a frequency between the first frequency and the second frequency upon detecting the first frequency and the second frequency from the received voltage values.

With the sixth aspect, upon detecting the first frequency and the second frequency from the received voltage values, the frequency of the AC power is set to a frequency between the first frequency and the second frequency. Therefore, the transmission of the AC power to the power receiving device can be started immediately after detecting the first frequency and the second frequency. As a result, a period taken for preparing the transmission of the AC power can be shortened, and the transmission of the AC power from the power transmitting antenna to the power receiving antenna can be started at earlier timing.

According to a seventh aspect, in the power transmitting device according to any one of the first to sixth aspects, the control circuit may control the power transmitting circuit to change the frequency of the AC power that is transmitted to the power receiving antenna, and may detect, among the changed frequencies, two frequencies corresponding to two local maximum values of transmission efficiency that is a ratio of the first DC power to the second DC power, and given that, of the two frequencies, a higher frequency is defined as an even-mode frequency (fH) and a lower frequency is defined as an odd-mode frequency (fL), a coupling coefficient k between the power transmitting antenna and the power receiving antenna may satisfy;

$$k=(fH-fL)\div(fH+fL)$$

wherein the coupling coefficient k may be in a range of $0.1<k<0.6$.

With the seventh aspect, a value of the coupling coefficient k is set to the range of $0.1<k<0.6$. In other words, the coupling coefficient is held comparatively low.

If the power receiving antenna is deviated to the left or the right relative to the power transmitting antenna, or if the power receiving antenna is moved away from the power transmitting antenna, the distance between the power transmitting antenna and the power receiving antenna may increase.

When the coupling coefficient k is high, an amount of magnetic flux, which is captured by the power receiving antenna, with respect to a total amount of magnetic flux generated from the power transmitting antenna is reduced as the distance between both the antennas increases. With reduction of the amount of magnetic flux, the voltage of the DC power output to the load is reduced. Consequently, an amount of the AC power transmitted from the power transmitting antenna is to be increased in order to maintain the voltage of the DC power, which has been held so far. When the power of the AC power transmitted from the power transmitting antenna is increased in such a way, there is a risk that a metallic foreign matter present around the power transmitting antenna may generate heat. Thus, when the value of the coupling coefficient k is high, a problem may occur from the viewpoint of safety with an increase of the distance between the power transmitting antenna and the power receiving antenna.

On the other hand, when the value of the coupling coefficient k is low, an amount of electric power, which is captured by the power receiving antenna, with respect to an amount of AC power transmitted from the power transmitting antenna is hardly changed even when the distance between the power transmitting antenna and the power receiving antenna increases. Stated in another way, a loss of the amount of electric power captured by the power receiving antenna is hardly changed with respect to variation of the distance between the power transmitting antenna and the power receiving antenna. As a result, there is no risk of causing the metallic foreign matter around the power transmitting antenna to generate heat, and safety is ensured.

Thus, by setting the value of the coupling coefficient k to the range of $0.1<k<0.6$, safety can be ensured and the power transmission from the power transmitting antenna to the power receiving antenna can be performed even when the distance between the power transmitting antenna and the power receiving antenna increases.

According to an eighth aspect, in the power transmitting device according to any one of the first to seventh aspects, the coupling coefficient k may be in a range of $0.2<k<0.4$.

With the eighth aspect, by setting the value of the coupling coefficient k to the range of $0.2<k<0.4$, the transmission efficiency can be increased while safety is ensured more reliably. Furthermore, by setting the value of the coupling coefficient k to the range of 0.2<k<0.4, it is possible to suppress change of the amount of electric power, and to avoid interrupt of the power transmission, which may occur due to a condition that the control of the power transmitting circuit fails to follow, even when the coupling coefficient varies. Moreover, when the amount of electric power (voltage) is controlled in terms of frequency, for example, the frequency range used is desired to be as narrow as possible, and hence the value of the coupling coefficient k is preferably set to the range of 0.2<k<0.4. When the amount of electric power (voltage) is controlled in terms of phase, for example, the phase is limited to the range of 0 to 180 degrees, and hence the value of the coupling coefficient k is preferably set to the range of 0.2<k<0.4.

According to a ninth aspect, in the power transmitting device according to any one of the first to eighth aspects, the control circuit may change the frequency of the AC power from a high frequency to a low frequency.

With the ninth aspect, the frequency of the AC power is changed from a high frequency to a low frequency. There is a tendency that, at a higher frequency, the voltage of the DC power output from the power receiving circuit to the load reduces. Therefore, the voltage of the DC power is gradually increased from a low level to a high level by changing the frequency of the AC power from the high frequency to the low frequency. As a result, damage of the circuit elements incorporated in the power receiving device can be avoided.

According to a tenth aspect, in the power transmitting device according to any one of the first to ninth aspects, the high frequency may be a frequency higher than the second frequency.

With the tenth aspect, by setting the high frequency to a frequency higher than the second frequency, inputting of the voltage of the DC power is started from a level lower than an operating voltage of the load. Therefore, damage of the circuit elements incorporated in the power receiving device can be reliably avoided at the start of inputting of the voltage of the DC power.

According to an eleventh aspect, the techniques disclosed here feature a wireless power transmission system comprising the power transmitting device according to any one of the first to tenth aspects, and the power receiving device.

According to a twelfth aspect, the techniques disclosed here feature a power transmitting method of transmitting AC power in a noncontact manner from a power transmitting device to a power receiving device comprising a power receiving antenna, a power receiving circuit that converts the AC power received by the power receiving antenna to first DC power, and a load to which the first DC power is output from the power receiving circuit, the power transmitting device comprising:

a power transmitting circuit that converts second DC power input from a DC power supply to AC power;

a power transmitting antenna that transmits the AC power output from the power transmitting circuit to the power receiving antenna; and a control circuit that receives, from the power receiving device, a voltage value of the first DC power that is output from the power receiving circuit to the load in the power receiving device, wherein the power transmitting method comprises:

controlling the power transmitting circuit to change a frequency of the AC power that is transmitted to the power receiving antenna, detecting, from the received voltage values, a first frequency corresponding to a local minimum value of the voltage values and a second frequency corresponding to the voltage value that takes a local maximum value at a frequency higher than the first frequency, and setting the frequency of the AC power transmitted to the power receiving antenna to a frequency between the first frequency and the second frequency.

According to a thirteenth aspect, the techniques disclosed here feature a program causing a computer in the power transmitting device to implement the power transmitting method according to the twelfth aspect.

According to a fourteenth aspect, the techniques disclosed here feature a computer-readable recording medium that records a program causing a computer in the power transmitting device to implement the power transmitting method according to the twelfth aspect.

According to a fifteenth aspect, the techniques disclosed here feature a wireless power transmission system including a power transmitting device and a power receiving device, the power transmitting device comprising:

a power transmitting circuit that converts input DC power to AC power and outputs the AC power;

a power transmitting antenna that transmits the AC power output from the power transmitting circuit;

a control circuit that controls the power transmitting circuit to change a frequency of the AC power that is output from the power transmitting circuit; and an input detecting circuit that detects at least one of a current and a voltage input to the power transmitting device, the power receiving device comprising:

a power receiving antenna that receives at least part of the AC power transmitted from the power transmitting antenna;

a power receiving circuit that converts the AC power received by the power receiving antenna to DC power;

an output detecting circuit that detects a voltage output from the power receiving circuit; and a communication circuit that communicates a result detected by the output detecting circuit to the control circuit wherein the control circuit sets an operation frequency range of the power transmitting circuit in accordance with the result detected by the output detecting circuit and communicated from the communication circuit, and decides, within the operation frequency range, the frequency of the AC power output to the power transmitting circuit in accordance with a result detected by the input detecting circuit.

According to a sixteenth aspect, in the wireless power transmission system or the power transmitting device in the wireless power transmission system according to any one of the first to fifteenth aspects, when the voltage indicated by the result detected by the output detecting circuit takes a local minimum value at a frequency $f1a$, a first local maximum value at a frequency $f2a$ higher than the frequency $f1a$, and a second local maximum value at a frequency $f3a$ lower than the frequency $f1a$, the control circuit sets, as a lower limit of the operation frequency range, a frequency $fL1a$ expressed by $f3a<fL1a \leq f1a$.

According to a seventeenth aspect, in the wireless power transmission system or the power transmitting device in the wireless power transmission system according to any one of the first to sixteenth aspects, when the voltage indicated by the result detected by the output detecting circuit takes a local minimum value at a frequency $f1a$, a first local maximum value at a frequency $f2a$ higher than the frequency $f1a$, and a second local maximum value at a frequency $f3a$ lower than the frequency $f1a$, the control circuit sets, as a lower limit of the operation frequency range, a frequency $fL2a$ expressed by $f1a<fL2a<f2a$.

According to an eighteenth aspect, in the wireless power transmission system or the power transmitting device in the wireless power transmission system according to any one of the first to seventeenth aspects, the control circuit sets the frequency f2a as an upper limit of the operation frequency range.

According to a nineteenth aspect, in the wireless power transmission system or the power transmitting device in the wireless power transmission system according to any one of the first to eighteenth aspects, the power receiving device further comprises a DC/DC converter that converts a magnitude of the DC voltage output from the power receiving circuit to a specified value, and that outputs the DC voltage of the specified value to the load.

According to a twentieth aspect, in the wireless power transmission system or the power transmitting device in the wireless power transmission system according to any one of the first to nineteenth aspects, the control circuit changes, in accordance with the result detected by the output detecting circuit, an output time ratio of the AC voltage, which is output from the power transmitting circuit, to make the DC voltage output from the power receiving circuit come closer to a specified value.

According to a twenty-first aspect, in the wireless power transmission system or the power transmitting device in the wireless power transmission system according to any one of the first to twentieth aspects, when the output time ratio in a condition of the DC voltage output from the power receiving circuit being maintained at the specified value takes a local maximum value at a frequency f1$b$, a first local minimum value at a frequency f2$b$ higher than the frequency f1$b$, and a second local minimum value at a frequency f3$b$ lower than the frequency f1$b$, the control circuit sets, as a lower limit of the operation frequency range, a frequency fL1$b$ expressed by f3$b$<fL1$b$≤f1$b$.

According to a twenty-second aspect, in the wireless power transmission system or the power transmitting device in the wireless power transmission system according to any one of the first to twenty-first aspects, when the output time ratio in a condition of the DC voltage output from the power receiving circuit being maintained at the specified value takes a local maximum value at a frequency f1$b$, a first local minimum value at a frequency f2$b$ higher than the frequency f1$b$, and a second local minimum value at a frequency f3$b$ lower than the frequency f1$b$, the control circuit sets, as a lower limit of the operation frequency range, a frequency fL2$b$ expressed by f1$b$<fL2$b$<f2$b$.

According to a twenty-third aspect, in the wireless power transmission system or the power transmitting device in the wireless power transmission system according to any one of the first to twenty-second aspects, the control circuit sets the frequency f2$b$ as an upper limit of the operation frequency range.

According to a twenty-fourth aspect, in the wireless power transmission system or the power transmitting device in the wireless power transmission system according to any one of the first to twenty-third aspects, the power transmitting device further comprises an input voltage conversion circuit that changes a magnitude of the input DC voltage, and the control circuit controls the input voltage conversion circuit in accordance with the result detected by the output detecting circuit to make the DC voltage output from the power receiving circuit come closer to the specified value.

According to a twenty-fifth aspect, in the wireless power transmission system or the power transmitting device in the wireless power transmission system according to any one of the first to twenty-fourth aspects, when an output voltage of the input voltage conversion circuit in a condition of the DC voltage output from the power receiving circuit being maintained at the specified value takes a local maximum value at a frequency f1$c$, a first local minimum value at a frequency f2$c$ higher than the frequency f1$c$, and a second local minimum value at a frequency f3$c$ lower than the frequency f1$c$, the control circuit sets, as a lower limit of the operation frequency range, a frequency fL1$c$ expressed by f3$c$<fL1$c$≤f1$c$.

According to a twenty-sixth aspect, in the wireless power transmission system or the power transmitting device in the wireless power transmission system according to any one of the first to twenty-fifth aspects, when an output voltage of the input voltage conversion circuit in a condition of the DC voltage output from the power receiving circuit being maintained at the specified value takes a local maximum value at a frequency f1$c$, a first local minimum value at a frequency f2$c$ higher than the frequency f1$c$, and a second local minimum value at a frequency f3$c$ lower than the frequency f1$c$, the control circuit sets, as a lower limit of the operation frequency range, a frequency fL2$c$ expressed by f1$c$<fL2$c$<f2$c$.

According to a twenty-seventh aspect, in the wireless power transmission system or the power transmitting device in the wireless power transmission system according to any one of the first to twenty-sixth aspects, the control circuit sets the frequency f2$c$ as an upper limit of the operation frequency range.

According to a twenty-eighth aspect, in the wireless power transmission system or the power transmitting device in the wireless power transmission system according to any one of the first to twenty-seventh aspects, the input detecting circuit detects both a current and a voltage input to the power transmitting device, the output detecting circuit detects both a voltage and a current output from the power receiving circuit, and the control circuit changes, in accordance with respective results detected by the output detecting circuit and the input detecting circuit, the frequency within the operation frequency range to make transmission efficiency come closer to a maximum.

According to a twenty-ninth aspect, in the wireless power transmission system or the power transmitting device in the wireless power transmission system according to any one of the first to twenty-eighth aspects, the control circuit changes, in accordance with the result detected by the input detecting circuit, the frequency within the operation frequency range to make the input current come closer to minimum when the DC voltage output from the power receiving circuit is maintained at the specified value.

According to a thirtieth aspect, in the wireless power transmission system or the power transmitting device in the wireless power transmission system according to any one of the first to twenty-ninth aspects, the power transmitting device further comprises a foreign matter detecting circuit that detects a metallic foreign matter present around the power transmitting antenna and the power receiving antenna, and the control circuit sets the frequency fL2$a$ as a lower limit of the operation frequency range when the foreign matter detecting circuit detects the metallic foreign matter.

According to a thirty-first aspect, in the wireless power transmission system or the power transmitting device in the wireless power transmission system according to any one of the first to thirtieth aspects, the power transmitting device further comprises a foreign matter detecting circuit that detects a metallic foreign matter present around the power transmitting antenna and the power receiving antenna, and the control circuit sets the frequency fL2b as a lower limit of the operation frequency range when the foreign matter detecting circuit detects the metallic foreign matter.

According to a thirty-second aspect, in the wireless power transmission system or the power transmitting device in the wireless power transmission system according to any one of the first to thirty-first aspects, the power transmitting device further comprises a foreign matter detecting circuit that detects a metallic foreign matter present around the power transmitting antenna and the power receiving antenna, and the control circuit sets the frequency fL2c as a lower limit of the operation frequency range when the foreign matter detecting circuit detects presence of the metallic foreign matter.

According to a thirty-third aspect, the techniques disclosed here feature the power transmitting device used in the wireless power transmission system according to any one of the first to thirty-second aspects.

According to a thirty-fourth aspect, the techniques disclosed here feature a program causing a computer, which is incorporated in the power transmitting device used in the wireless power transmission system according to any one of the first to thirty-third aspects, to execute the steps of:

setting an operation frequency range of the power transmitting circuit in accordance with the result detected by the output detecting circuit and communicated from the communication circuit, and deciding, within the operation frequency range, the frequency of the AC power output from the power transmitting circuit in accordance with the result detected by the input detecting circuit.

Categories of the above-described power transmitting device, wireless power transmission system, power transmitting method, program, and recording medium can be freely modified to other categories.

The techniques disclosed here can be applied to an electronic unit such as a smartphone, a tablet terminal, or notebook PC, and to a charging system that charges a motor-driven machine, such as an electric car, with electricity.

What is claimed is:

1. A power transmitting device, which transmits AC power in a noncontact manner to a power receiving device comprising a power receiving antenna, a power receiving circuit that converts the AC power received by the power receiving antenna to first DC power, and a load to which the first DC power is output from the power receiving circuit, the power transmitting device comprising:
    a power transmitting circuit that converts second DC power input from a DC power supply to AC power;
    a power transmitting antenna that transmits the AC power output from the power transmitting circuit to the power receiving antenna; and
    a control circuit that receives, from the power receiving device, a voltage value of the first DC power output from the power receiving circuit to the load in the power receiving device,
    wherein the control circuit controls the power transmitting circuit to change a frequency of the AC power that is transmitted to the power receiving antenna,
    detects, from the received voltage values, a first frequency corresponding to a local minimum value of the voltage values and a second frequency corresponding to the voltage value that takes a local maximum value at a frequency higher than the first frequency, and
    sets the frequency of the AC power transmitted to the power receiving antenna to a frequency between the first frequency and the second frequency.

2. The power transmitting device according to claim 1, wherein the control circuit changes the frequency of the AC power during a specified period after the voltage value has reached a specified value,
    detects the first frequency and the second frequency from the voltage values received during the specified period, and
    sets the frequency of the AC power to a frequency between the first frequency and the second frequency after the specified period has lapsed.

3. The power transmitting device according to claim 1, wherein the control circuit sets the frequency of the AC power to a frequency between the first frequency and the second frequency upon detecting the first frequency and the second frequency from the received voltage values.

4. The power transmitting device according to claim 1, wherein the control circuit, in operation, transmits the AC power to the power receiving antenna in advance, using a plurality of frequencies of the AC power, from a high frequency to a low frequency.

5. The power transmitting device according to claim 4, wherein the high frequency is a frequency higher than the second frequency.

6. A wireless power transmission system comprising the power transmitting device according to claim 1, and the power receiving device.

7. A method of transmitting AC power in a noncontact manner from a power transmitting device to a power receiving device, the power receiving device including a power receiving antenna, a power receiving circuit that converts the AC power received by the power receiving antenna to first DC power, and a load to which the first DC power is output from the power receiving circuit, the method comprising:
    converting second DC power input from a DC power supply to AC power;
    controlling the power transmitting circuit to transmit the AC power to the power receiving antenna in advance, using a plurality of frequencies of the AC power;
    receiving, from the power receiving device, a plurality of voltage values of the first DC power corresponding to the plurality of frequencies of the AC power;
    detecting among the plurality of the voltage values of the first DC power received from the power receiving device, a first frequency corresponding to a local minimum value of the voltage values of the first DC power and a second frequency corresponding to a local maximum value of voltage values of the first DC power, the second frequency being higher than the first frequency;
    determining one frequency of the AC power used for transmitting the AC power to the power receiving antenna, between the first frequency and the second frequency; and
    transmitting the AC power output from the power transmitting circuit to the power receiving antenna.

8. A non-transitory computer-readable recording medium that records a program causing a computer in the power transmitting device to implement the method according to claim 7.

* * * * *